United States Patent [19]
Glassey

[11] Patent Number: 5,604,854
[45] Date of Patent: Feb. 18, 1997

[54] SYSTEM AND METHODS FOR REFORMATTING MULTI-DIMENSIONAL SPREADSHEET INFORMATION

[75] Inventor: Colin R. Glassey, San Jose, Calif.

[73] Assignee: Borland International, Inc., Scotts Valley, Calif.

[21] Appl. No.: 651,580

[22] Filed: May 22, 1996

Related U.S. Application Data

[63] Continuation of Ser. No. 233,143, Apr. 22, 1994, abandoned.

[51] Int. Cl.$^6$ .................................................. G06F 17/30
[52] U.S. Cl. ........................ 395/764; 395/765; 395/342
[58] Field of Search ............................ 395/144, 145, 395/146, 148, 155, 157, 159, 160, 161; 364/419.17, 419.19; 345/59

[56] References Cited

U.S. PATENT DOCUMENTS

| | | | |
|---|---|---|---|
| 5,303,146 | 4/1994 | Ammirato et al. | 364/401 |
| 5,312,478 | 5/1994 | Reed et al. | 395/148 |
| 5,317,686 | 5/1994 | Salas et al. | 395/157 |
| 5,319,777 | 6/1994 | Perez | 395/600 |
| 5,359,724 | 10/1994 | Earle | 395/425 |
| 5,416,895 | 5/1995 | Anderson et al. | 395/148 |

FOREIGN PATENT DOCUMENTS

WO92/04678  3/1992  European Pat. Off. .

OTHER PUBLICATIONS

Cobb, *Exel in Business*, Microsoft Press, 1985, pp. 13, 14, 58, 59, 313, 321, 456, 457.
Campbell, *Quattro Pro® 5.0 for Windows™ Handbook*, Borland Press, 1993, p. 238.
Stinson, C., *New Dimensions in Spreadsheets*, PC Magazine, Sep. 28, 1993, pp. 183–208.
Walkenbach, J., *Windows Spreadsheets: World–Class Analysis Tools*, PC World, Feb. 1994, pp. 150–166, 169–174.

*Primary Examiner*—Heather R. Herndon
*Assistant Examiner*—Stephen Hong
*Attorney, Agent, or Firm*—John A. Smart; David N. Slone

[57] ABSTRACT

An electronic spreadsheet system of the present invention includes a Data Modeling module for creating multi-dimensional reports from spreads of information. The module includes a preferred report workspace interface—a Data Modeling Desktop—for receiving a user-specified range of source data from an electronic spreadsheet, which may include 2-D as well as 3-D ranges of source data from a spreadsheet notebook. In response to user inputs, the system assembles a corresponding multi-dimensional report by transforming 2-D or 3-D spreadsheet information into multi-dimensional format. In this manner, users can continue to build spreadsheet models on an ad hoc basis (i.e., without designing complex multi-dimensional data models beforehand). When multi-dimensional reporting is desired, the users need only indicate to the system that the then-existing spreadsheet information (which is not in multi-dimensional format) is to be automatically converted by the system into a corresponding multi-dimensional structure, for further analysis and reporting.

23 Claims, 26 Drawing Sheets

| | | 1991 | | | | 1992 | | | |
|---|---|---|---|---|---|---|---|---|---|
| | | Q1 | Q2 | Q3 | Q4 | Q1 | Q2 | Q3 | Q4 |
| | | Sales | Sales | Sales | Sales | Sales | Sales | Sales | Sales |
| Beaulieu | East | 175090.00 | 184000.00 | 197725.00 | 203365.00 | 192910.00 | 195700.00 | 203275.00 | 201520.00 |
| | North | 176400.00 | 190425.00 | 201055.00 | 212600.00 | 194700.00 | 197478.00 | 203375.00 | 207807.00 |
| | South | 133490.00 | 135930.00 | 130370.00 | 144115.00 | 120550.00 | 121693.00 | 124804.00 | 138920.00 |
| | West | 133160.00 | 134785.00 | 140425.00 | 149370.00 | 120090.00 | 124321.00 | 122892.00 | 127920.00 |
| Duckhorn | East | 71040.00 | 71188.00 | 71780.00 | 73852.00 | 130240.00 | 130536.00 | 131720.00 | 132756.00 |
| | North | 127280.00 | 128168.00 | 129796.00 | 131720.00 | 74000.00 | 74296.00 | 75184.00 | 75480.00 |
| | South | 90872.00 | 91168.00 | 91908.00 | 95016.00 | 42920.00 | 43068.00 | 43660.00 | 44548.00 |
| | West | 40700.00 | 41440.00 | 42180.00 | 42772.00 | 90280.00 | 91464.00 | 91612.00 | 94720.00 |

| | | 1991 | | | | 1992 | | | |
|---|---|---|---|---|---|---|---|---|---|
| | | Q1 | Q2 | Q3 | Q4 | Q1 | Q2 | Q3 | Q4 |
| | | Sales | Sales | Sales | Sales | Sales | Sales | Sales | Sales |
| East | Beaulieu | 175090.00 | 184000.00 | 197725.00 | 203365.00 | 192910.00 | 195700.00 | 203275.00 | 201520.00 |
| | Duckhorn | 71040.00 | 71188.00 | 71780.00 | 73852.00 | 130240.00 | 130536.00 | 131720.00 | 132756.00 |
| North | Beaulieu | 176400.00 | 190425.00 | 201055.00 | 212600.00 | 194700.00 | 197478.00 | 203375.00 | 207807.00 |
| | Duckhorn | 127280.00 | 128168.00 | 129796.00 | 131720.00 | 74000.00 | 74296.00 | 75184.00 | 75480.00 |
| South | Beaulieu | 133490.00 | 135930.00 | 130370.00 | 144115.00 | 120550.00 | 121693.00 | 124804.00 | 138920.00 |
| | Duckhorn | 90872.00 | 91168.00 | 91908.00 | 95016.00 | 42920.00 | 43068.00 | 43660.00 | 44548.00 |
| West | Beaulieu | 133160.00 | 134785.00 | 140425.00 | 149370.00 | 120090.00 | 124321.00 | 122892.00 | 127920.00 |
| | Duckhorn | 40700.00 | 41440.00 | 42180.00 | 42772.00 | 90280.00 | 91464.00 | 91612.00 | 94720.00 |

FIG. 5E — 510h

| | | 1991 | | | | | | | | 1992 | | | | | | | |
|---|---|---|---|---|---|---|---|---|---|---|---|---|---|---|---|---|---|
| | | Q1 | Q2 | | Q3 | | Q4 | | Q1 | | Q2 | | Q3 | | Q4 | |
| | | Cases Sold | Cases Sold | | Cases Sold | | Cases Sold | | Cases Sold | | Cases Sold | | Cases Sold | | Cases Sold | |
| East | Beaulieu | 1080.00 | 1135.00 | | 1220.00 | | 1255.00 | | 1190.00 | | 1207.00 | | 1254.00 | | 1243.00 | |
| | Duckhorn | 480.00 | 481.00 | | 485.00 | | 499.00 | | 880.00 | | 882.00 | | 890.00 | | 897.00 | |
| North | Beaulieu | 1080.00 | 1165.00 | | 1230.00 | | 1300.00 | | 1190.00 | | 1207.00 | | 1243.00 | | 1270.00 | |
| | Duckhorn | 860.00 | 866.00 | | 877.00 | | 890.00 | | 500.00 | | 502.00 | | 508.00 | | 510.00 | |
| South | Beaulieu | 820.00 | 835.00 | | 800.00 | | 885.00 | | 740.00 | | 747.00 | | 766.00 | | 852.00 | |
| | Duckhorn | 614.00 | 616.00 | | 621.00 | | 642.00 | | 290.00 | | 291.00 | | 295.00 | | 301.00 | |
| West | Beaulieu | 820.00 | 830.00 | | 865.00 | | 920.00 | | 740.00 | | 766.00 | | 757.00 | | 788.00 | |
| | Duckhorn | 275.00 | 280.00 | | 285.00 | | 289.00 | | 610.00 | | 618.00 | | 619.00 | | 640.00 | |

| | | Q1 | | 1991 Q2 | | Q3 | | Q4 | | Q1 | |
|---|---|---|---|---|---|---|---|---|---|---|---|
| | | Sales | Cases Sold | Sales | Cases Sold | Sales | Cases Sold | Sales | Cases Sold | Sales | Cases Sold |
| East | Beaulieu | 175090.00 | 1080.00 | 184000.00 | 1135.00 | 197725.00 | 1220.00 | 203365.00 | 1255.00 | 192910.00 | 1190.00 |
| | Duckhorn | 71040.00 | 480.00 | 71188.00 | 481.00 | 71780.00 | 485.00 | 73852.00 | 499.00 | 130240.00 | 880.00 |
| North | Beaulieu | 176400.00 | 1080.00 | 190425.00 | 1165.00 | 201055.00 | 1230.00 | 212600.00 | 1300.00 | 194700.00 | 1190.00 |
| | Duckhorn | 127280.00 | 860.00 | 128168.00 | 866.00 | 129796.00 | 877.00 | 131720.00 | 890.00 | 74000.00 | 500.00 |
| South | Beaulieu | 133490.00 | 820.00 | 135930.00 | 835.00 | 130370.00 | 800.00 | 144115.00 | 885.00 | 120550.00 | 740.00 |
| | Duckhorn | 90872.00 | 614.00 | 91168.00 | 616.00 | 91908.00 | 621.00 | 95016.00 | 642.00 | 42920.00 | 290.00 |
| West | Beaulieu | 133160.00 | 820.00 | 134785.00 | 830.00 | 140425.00 | 865.00 | 149370.00 | 920.00 | 120090.00 | 740.00 |
| | Duckhorn | 40700.00 | 275.00 | 41440.00 | 280.00 | 42180.00 | 285.00 | 42772.00 | 289.00 | 90280.00 | 610.00 |

|   |   | Red | Blue | Green |
|---|---|-----|------|-------|
| S | A | 4.00 | 3.00 | 2.00 |
|   | B | 2.00 | 4.00 | 1.00 |
|   | C | 2.00 | 4.00 | 1.00 |
| M | A | 6.00 | 8.00 | 3.00 |
|   | B | 3.00 | 5.00 | 2.00 |
|   | C | 4.00 | 6.00 | 2.00 |
| L | A | 5.00 | 6.00 | 1.00 |
|   | B | 5.00 | 5.00 | 2.00 |
|   | C | 5.00 | 5.00 | 2.00 |
| XL | A | 3.00 | 4.00 | 2.00 |
|   | B | 4.00 | 6.00 | 1.00 |
|   | C | 4.00 | 3.00 | 0.00 |

FIG. 6E

|   |   | Red | Blue | Green |
|---|---|-----|------|-------|
| S | A | 4.00 | 3.00 | 2.00 |
|   | B | 2.00 | 4.00 | 1.00 |
|   | C | 2.00 | 4.00 | 1.00 |
| M | A | 6.00 | 8.00 | 3.00 |
|   | B | 3.00 | 5.00 | 2.00 |
|   | C | 4.00 | 6.00 | 2.00 |
| L | A | 5.00 | 6.00 | 1.00 |
|   | B | 5.00 | 5.00 | 2.00 |
|   | C | 5.00 | 5.00 | 2.00 |
| XL | A | 3.00 | 4.00 | 2.00 |
|   | B | 4.00 | 6.00 | 1.00 |
|   | C | 4.00 | 3.00 | 0.00 |
| TOTAL | | 47.00 | 59.00 | 19.00 |

FIG. 6F

|   |   | Red | Blue | Green |
|---|---|-----|------|-------|
| A | S | 4.00 | 3.00 | 2.00 |
|   | M | 6.00 | 8.00 | 3.00 |
|   | L | 5.00 | 6.00 | 1.00 |
|   | XL | 3.00 | 4.00 | 2.00 |
| B | S | 2.00 | 4.00 | 1.00 |
|   | M | 3.00 | 5.00 | 2.00 |
|   | L | 5.00 | 5.00 | 2.00 |
|   | XL | 4.00 | 6.00 | 1.00 |
| C | S | 2.00 | 4.00 | 1.00 |
|   | M | 4.00 | 6.00 | 2.00 |
|   | L | 5.00 | 5.00 | 2.00 |
|   | XL | 4.00 | 3.00 | 0.00 |

FIG. 6G

|   |   | Red | Blue | Green |
|---|---|-----|------|-------|
| A | S | 4.00 | 3.00 | 2.00 |
|   | M | 6.00 | 8.00 | 3.00 |
|   | L | 5.00 | 6.00 | 1.00 |
|   | XL | 3.00 | 4.00 | 2.00 |
| B | S | 2.00 | 4.00 | 1.00 |
|   | M | 3.00 | 5.00 | 2.00 |
|   | L | 5.00 | 5.00 | 2.00 |
|   | XL | 4.00 | 6.00 | 1.00 |
| C | S | 2.00 | 4.00 | 1.00 |
|   | M | 4.00 | 6.00 | 2.00 |
|   | L | 5.00 | 5.00 | 2.00 |
|   | XL | 4.00 | 3.00 | 0.00 |
| TOTAL | | 47.00 | 59.00 | 19.00 |

FIG. 6H

|   |       | S     | M     | L     | XL    | TOTAL |
|---|-------|-------|-------|-------|-------|-------|
|   | Red   | 4.00  | 6.00  | 5.00  | 3.00  | 18.00 |
| A | Blue  | 3.00  | 8.00  | 6.00  | 4.00  | 21.00 |
|   | Green | 2.00  | 3.00  | 1.00  | 2.00  | 8.00  |
|   | Red   | 2.00  | 3.00  | 5.00  | 4.00  | 14.00 |
| B | Blue  | 4.00  | 5.00  | 5.00  | 6.00  | 20.00 |
|   | Green | 1.00  | 2.00  | 2.00  | 1.00  | 6.00  |
|   | Red   | 2.00  | 4.00  | 5.00  | 4.00  | 15.00 |
| C | Blue  | 4.00  | 6.00  | 5.00  | 3.00  | 18.00 |
|   | Green | 1.00  | 2.00  | 2.00  | 0.00  | 5.00  |
|   | Red   | 8.00  | 13.00 | 15.00 | 11.00 | 47.00 |
| TOTAL | Blue | 11.00 | 19.00 | 16.00 | 13.00 | 59.00 |
|   | Green | 4.00  | 7.00  | 5.00  | 3.00  | 19.00 |

*FIG. 6I*

|   |   |       |       |
|---|---|-------|-------|
|   |   | Red   | 4.00  |
|   | S | Blue  | 3.00  |
|   |   | Green | 2.00  |
|   |   | Red   | 6.00  |
|   | M | Blue  | 8.00  |
|   |   | Green | 3.00  |
| A |   | Red   | 5.00  |
|   | L | Blue  | 6.00  |
|   |   | Green | 1.00  |
|   |   | Red   | 3.00  |
|   | XL| Blue  | 4.00  |
|   |   | Green | 2.00  |
|   |   | Red   | 18.00 |
|   |TOTAL| Blue | 21.00 |
|   |   | Green | 8.00  |
|   |   | Red   | 2.00  |
|   | S | Blue  | 4.00  |
|   |   | Green | 1.00  |
|   |   | Red   | 3.00  |
|   | M | Blue  | 5.00  |
|   |   | Green | 2.00  |
| B |   | Red   | 5.00  |
|   | L | Blue  | 5.00  |
|   |   | Green | 2.00  |
|   |   | Red   | 4.00  |
|   | XL| Blue  | 6.00  |
|   |   | Green | 1.00  |

*FIG. 6J*

|   |       |       |       |
|---|-------|-------|-------|
|   |       | Red   | 4.00  |
|   | A     | Blue  | 3.00  |
|   |       | Green | 2.00  |
|   |       | Red   | 2.00  |
|   | B     | Blue  | 4.00  |
| S |       | Green | 1.00  |
|   |       | Red   | 2.00  |
|   | C     | Blue  | 4.00  |
|   |       | Green | 1.00  |
|   |       | Red   | 8.00  |
|   | TOTAL | Blue  | 11.00 |
|   |       | Green | 4.00  |
|   |       | Red   | 6.00  |
|   | A     | Blue  | 8.00  |
|   |       | Green | 3.00  |
|   |       | Red   | 3.00  |
|   | B     | Blue  | 5.00  |
| M |       | Green | 2.00  |
|   |       | Red   | 4.00  |
|   | C     | Blue  | 6.00  |
|   |       | Green | 2.00  |
|   |       | Red   | 13.00 |
|   | TOTAL | Blue  | 19.00 |
|   |       | Green | 7.00  |
|   |       | Red   | 5.00  |
|   | A     | Blue  | 6.00  |
|   |       | Green | 1.00  |

*FIG. 6K*

Data Modeling Desktop - PETS.DMD

File  Edit  Build  Gadget  Font  Preferences  Help

710

|  | Cat | | Dog | | Fish | | Parrot | | Pig | |
|---|---|---|---|---|---|---|---|---|---|---|
|  | Cost | Health | Cost | Health | Cost | Health | Cost | Health | Cost | Health |
| USA | 24.00 | Good | 23.00 | Ok | 26.00 | Ok | 25.00 | Poor | 27.00 | Good |
| England | 13.00 | Good | 12.00 | Ok | 15.00 | Ok | 14.00 | Poor | 16.00 | Good |
| Egypt | 15.00 | Good | 14.00 | Ok | 17.00 | Ok | 16.00 | Poor | 18.00 | Good |

Data copied from: PETS.WB1

| Country | Pet | Health | Cost | Food |
|---|---|---|---|---|
| USA | Dog | Ok | 23 | 44 |
| USA | Cat | Good | 24 | 45 |
| USA | Parrot | Poor | 25 | 46 |
| USA | Fish | Ok | 26 | 47 |
| USA | Pig | Good | 27 | 48 |
| England | Dog | Ok | 12 | 44 |
| England | Cat | Good | 13 | 45 |
| England | Parrot | Poor | 14 | 46 |
| England | Fish | Ok | 15 | 47 |
| England | Pig | Good | 16 | 48 |
| Egypt | Dog | Ok | 14 | 33 |
| Egypt | Cat | Good | 15 | 34 |
| Egypt | Parrot | Poor | 16 | 35 |

SYSTEM AND METHODS FOR REFORMATTING MULTI-DIMENSIONAL SPREADSHEET INFORMATION

This is a file wrapper continuation application of application Ser. No. 08/233,143 filed Apr. 22, 1994 which is now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of information processing by digital computers and, more particularly, to the processing and presentation of information by application programs, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to error. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visual calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the data stored in spreadsheet cells. In this fashion, cell references can serve as variables in an equation, thereby allowing precise mathematical relationships to be defined between cells.

The structure and general operation of a spreadsheet program, including spreadsheet formulas and "macros," are documented in the technical, trade, and patent literature. For an overview, see e.g., Cobb, D., *Using 1-2-3*, Que Corp., 1985; and Campbell, M., *Quattro Pro 4.0 Handbook*, 4th Ed., 1992. The disclosures of each of the foregoing references are hereby incorporated by reference.

A particular advantage of electronic spreadsheets is the ability to create a multitude of "what if" scenarios from a single data model. This ability stems largely from the spreadsheet formulas, which are the means by which a user tells an electronic spreadsheet system how to manipulate and analyze one's data. After a set of mathematical relationships has been entered into a worksheet, the spread of information can be "recalculated" using different sets of assumptions, with the results of each recalculation appearing relatively quick. Performing this operation manually, with paper and pencil, would require recalculating every relationship in the model with each change made. Expectedly, electronic spreadsheets have quickly displaced their pencil-and-paper counterparts for modeling user information.

Spreadsheets have always had the capability to handle record and field-oriented data. As a result, one of the most common spreadsheet activities is working with simple databases—simple lists or tables of information. A common method of summarizing data in such a spreadsheet is to generate a cross-tab table. For instance, if a user has a spread consisting of monthly sales data, he or she can generate a two-way cross-tab table showing product names down the left side and regions across the top. The intersection of each row and column displays the total sales for the product for a given region.

Suppose in the prior example that the user wants to extend the analysis to include months. As databases can contain a lot of information, a user will often need to work with data in more than two dimensions. As data becomes more complex, however, conventional spreadsheets are less than an ideal solution. In 1-2-3 for Windows, for instance, a user can generate a summary table from a spread of information (by invoking the Tools|Database|Cross-tab command), but the user is limited to two dimensions at a time. For instance, the user can generate a table that shows the total sales amount by region and month, but he or she cannot see sales to new and existing clients in the same table. The same limitation also applies for displaying both the dollar sales and number of sales. Of course the user could perform a query on the table to select new sales and then generate a cross-tab table with the query result, and then perform yet another query to isolate sales to existing customers, and then (finally) generate another cross-tab table. The process would give the user the information desired, but it is, at best, a clumsy approach requiring several steps; moreover, the results would appear in two different tables. Conventional spreadsheets are poorly suited for modeling multi-dimensional information.

Dedicated data modeling programs have long since been known in the art. Based largely on an earlier program named Javelin™ (released in 1985), these programs maintain multi-dimensional information as highly structured data models. Improv™, from Lotus, is typical of these Data Modeling programs. It is adept at swapping categories between axes so that a user can see a common base of information from different vantage points. Moreover, it enforces the notion of formula generality. Unlike most spreadsheets which store formulas in cells, Improv's formulas are global—meaning that a single formula can produce results in dozens or hundreds of cells. This eliminates the common spreadsheet routine of building a formula and then copying it to adjacent cells. The user enters the global formulas into a special formula pane and the formulas are evaluated in order. Improv's formulas refer to categories and item names rather than cell references. For example, the user is required to express the cost of goods sold as the sum of various named factors (such as Materials.cost+Production.cost), as opposed to references to worksheet coordinates.

Improv's strength is also its weakness. Although it is helpful for modeling multi-dimensional information, it is poorly suited as a general-purpose spreadsheet. Using general formulas has tended to confuse most spreadsheet users. Even the most simple task, such as adding two cells together, becomes a chore with such a product. Accordingly, Improv and its predecessor, Javelin, have both enjoyed little commercial success.

Instead of being forced to adapt radically different approaches to handling spreadsheet information, users want to continue to be able to build spreadsheet models on an ad hoc basis. When multi-dimensional reporting is desired, the users want to be able to take their then-existing spreadsheet file and have the system convert it automatically into the requisite multi-dimensional structure. Accordingly, there is great interest in developing solutions that allow users to continue working in a familiar spreadsheet environment yet, at the same time, allow users to generate multi-dimensional reports on-demand.

SUMMARY OF THE INVENTION

An electronic spreadsheet system of the present invention includes a Data Modeling module for creating multi-dimensional reports from a spread of information. The module includes a preferred report workspace interface—a Data Modeling Desktop—for receiving a user-specified range of source data from an electronic spreadsheet, which may include 2-D as well as 3-D ranges of source data from a spreadsheet notebook.

A method of transforming a 3-D block of information cells from a spreadsheet into a source data window suitable for use in multi-dimensional reporting proceeds as follows. First, the system receives a user request to transfer data to the Data Modeling Desktop (DMD). The system transmits a destination cell (of where to return the information), a source file name, a new column name, page names, whether the source block is 2-D or 3-D, and link type (i.e., "hot" or "cold"). The spreadsheet block data is placed in shared memory, such as Windows' clipboard, where it may be accessed by the Data Modeling Desktop workspace.

The system next determines how many columns of data are present and then stores a first row internally for recognition of boundaries (between pages). The system adds the (user-specified) new column name to the first row, and stores it as a data header. The system scans the next row to determine whether it matches the first row (i.e., contains the same data header). If a match is found, the next page name is used as the data header, with the system looping back to examine subsequent rows. If a match is not found (i.e., normal case), however, the current page name is added as the first element in a Source Window table. The system loops back to examine remaining data members.

A copy of the user-specified source data appears in the Source Window at the bottom of the Data Modeling Desktop. To build a multi-dimensional report, the user need only click on desired columns in the Source Window and then on screen buttons located on a toolbar. To turn a source field into column headings, for instance, the user clicks once on the field and once on a column-heading icon. To enter numbers in the report's data area, the user clicks on a field in the Source Window (storing the desired data) and then on a data area icon. In response, the system assembles a corresponding multi-dimensional report.

The user can reformat the multi-dimensional report, as desired. For instance, each column and row heading in the report is accompanied by a handle which permits the user to reorganize the report by "pivoting" (dragging across an axis) categories of information. The Data Modeling Desktop can also be employed to add group summary data to the report, such as quarterly subtotals or yearly grand totals. Items along either axis can also be grouped by simply selecting a set of adjacent items and clicking a paper clip icon.

When the user is satisfied with the report, he or she may click a spreadsheet icon in the Data Modeling Desktop to send the report back to a user-designated (or default) destination in his or her spreadsheet notebook. The user may specify a "hot" link (e.g., using Windows DDE) so that changes occurring in the underlying spread of information are automatically reflected in the corresponding multi-dimensional report (and vice versa).

BRIEF DESCRIPTION OF THE DRAWINGS

FIG. 3A is a bitmap screenshot illustrating a spreadsheet notebook storing a spread of information which multi-dimensional data analysis desired.

FIG. 3B is a bitmap screenshot illustrating an exemplary dialog for sending a spread of information to the Data Modeling module of the present invention.

FIGS. 5A–B are bitmap screenshots illustrating "pivoting" (reformatting) of the multi-dimensional report.

FIGS. 5C–F are bitmap screenshots illustrating additional formatting of the multi-dimensional report.

FIG. 6A is a bitmap screenshot illustrating a three-dimensional spread of information, stored in three consecutive pages of a spreadsheet notebook.

FIGS. 6E–K illustrate additional formatting for the multi-dimensional report.

FIG. 7B is a bitmap screenshot illustrating creation of a multi-dimensional report from the 3-D block (taken from the spreadsheet notebook of FIG. 7A).

DETAILED DESCRIPTION OF A PREFERRED EMBODIMENT

The following description will focus on the presently preferred embodiments of the present invention, which are embodied in an electronic spreadsheet system operative in a Microsoft® Windows environment. The present invention, however, is not limited to any particular environment or any particular application. Instead, those skilled in the art will find that the teachings of the present invention may be advantageously applied to a variety of different architectures, including Apple Macintosh, PowerPC, and the like. Therefore, the description of the exemplary embodiments which follows is for purposes of illustration and not limitation.

General System

A. Hardware

Figure 1A:
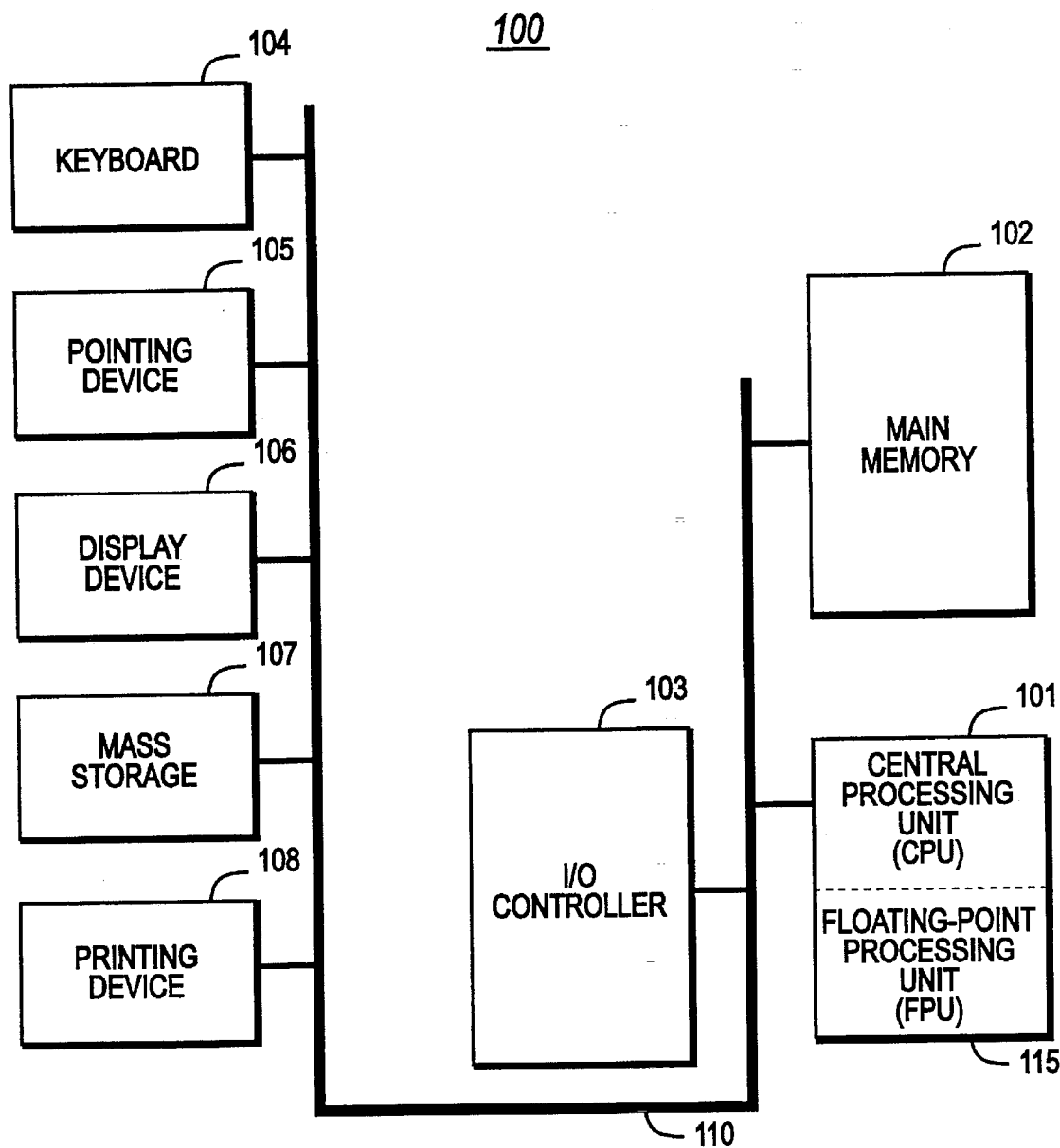
FIG. 1A is a block diagram of a computer system in which the present invention may be embodied.

As shown in FIG. 1A, the present invention may be embodied in a computer system such as the system 100, which includes a central processing unit (CPU) 101, a math coprocessor or floating-point processing unit (FPU) 115, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

B. Software system

1. Overview

Figure 1B:
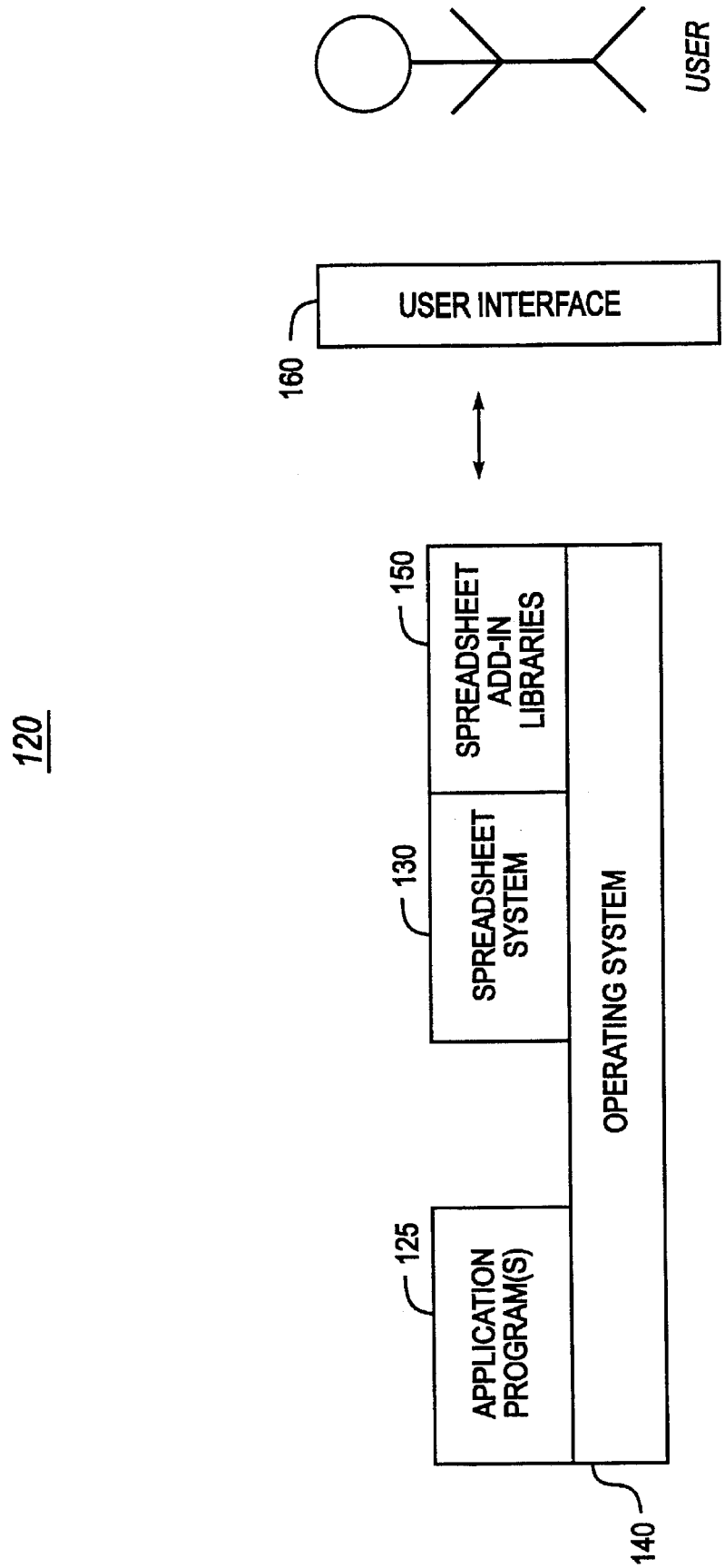
FIG. 1B is a block diagram of a software system of the present invention, which includes operating system, application software, and user interface components.

Illustrated in FIG. 1B, a computer software system 120 is provided for directing the operation of the computer system 100. Software system 120, which is stored in system memory 102 and on disk memory 107, includes a kernel or operating system 140 and an interface 160. One or more application programs, such as application software 125, may be "loaded" (i.e., transferred from storage 107 into memory 102) for execution by the system 100. The system 100 receives user commands and data through user interface 160; these inputs may then be acted upon by the system 100 in accordance with instructions from operating system module 140 and/or application module 125. The interface 160, which may support a character-based and/or preferably a graphical user interface (GUI), also serves to display results, whereupon the user may supply additional inputs or terminate the session. In a preferred embodiment, operating system 140 comprises MS-DOS® operating in conjunction with Microsoft®Windows; both are available from Microsoft of Redmond, Wash. Interface 160, on the other hand, is typically provided by the application programs and spreadsheet system 130, which will now be described.

2. Electronic Spreadsheet

As shown, system 120 also includes a spreadsheet system 130 of the present invention. The spreadsheet system 130 interfaces with the system 100 through the operating system 140. Spreadsheet system 130 may also be operably coupled to one or more spreadsheet add-in libraries 150, which are commercially available.

Figure 1C:
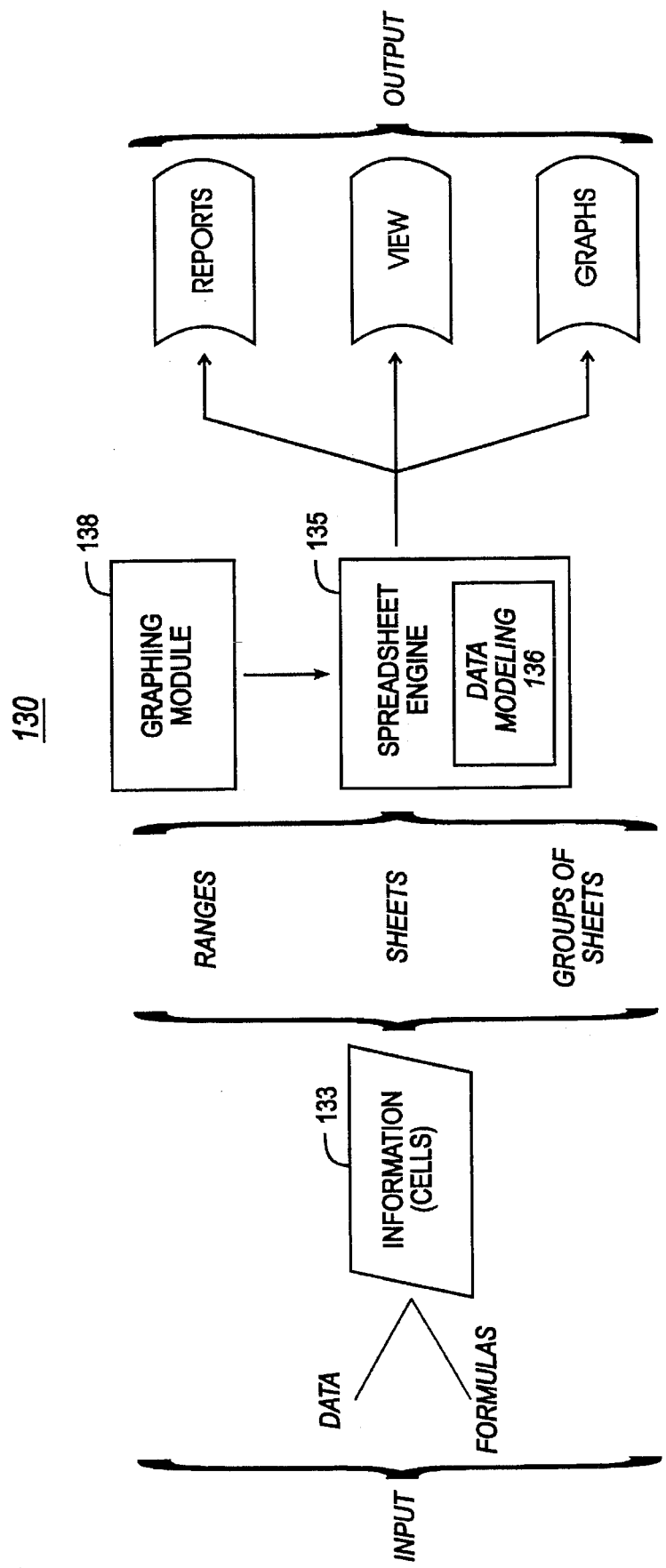
FIG. 1C is a block diagram of an electronic spreadsheet system of the present invention.

The spreadsheet system 130 of the present invention is shown in further detail by a simplified block diagram of FIG. 1C. The system 130 includes a spreadsheet engine or module 135 and a graphing module 138. In operation, the system 130 maintains a matrix or "spread" of information cells 133, each cell being an atomic unit maintained and processed by the module 135. Data and formulas for the cells are received from an input device (e.g., keyboard, mouse, disk, and the like) for storage and processing by the system 130. From the cells, larger groupings, such as ranges (including blocks), sheets (including 2-D spreads), and groups of sheets (including 3-D spreads, linked sheets, and pages of sheets or "notebooks") may be defined. The graphing module 138 provides the system 130 with the capability of displaying the spread of information cells visually, such as in various graphs.

As shown, the spreadsheet engine 135 includes a Data Modeling module 136 of the present invention. The Data Modeling module 136 processes the various formulas stored in a spreadsheet during spreadsheet recalculation. Of particular interest are methods of the Data Modeling module 136 for reformatting three-dimensional spreadsheet information. Operation of the Data Modeling module 136 is described in greater detail hereinbelow.

In a preferred embodiment, the spreadsheet system 130 includes Quattro® Pro for Windows, available from Borland International of Scotts Valley, Calif. A description of the general features and user operation of system 130 is available in the documentation which accompanies Quattro® Pro for Windows.

3. Notebook interface

Figure 2A:
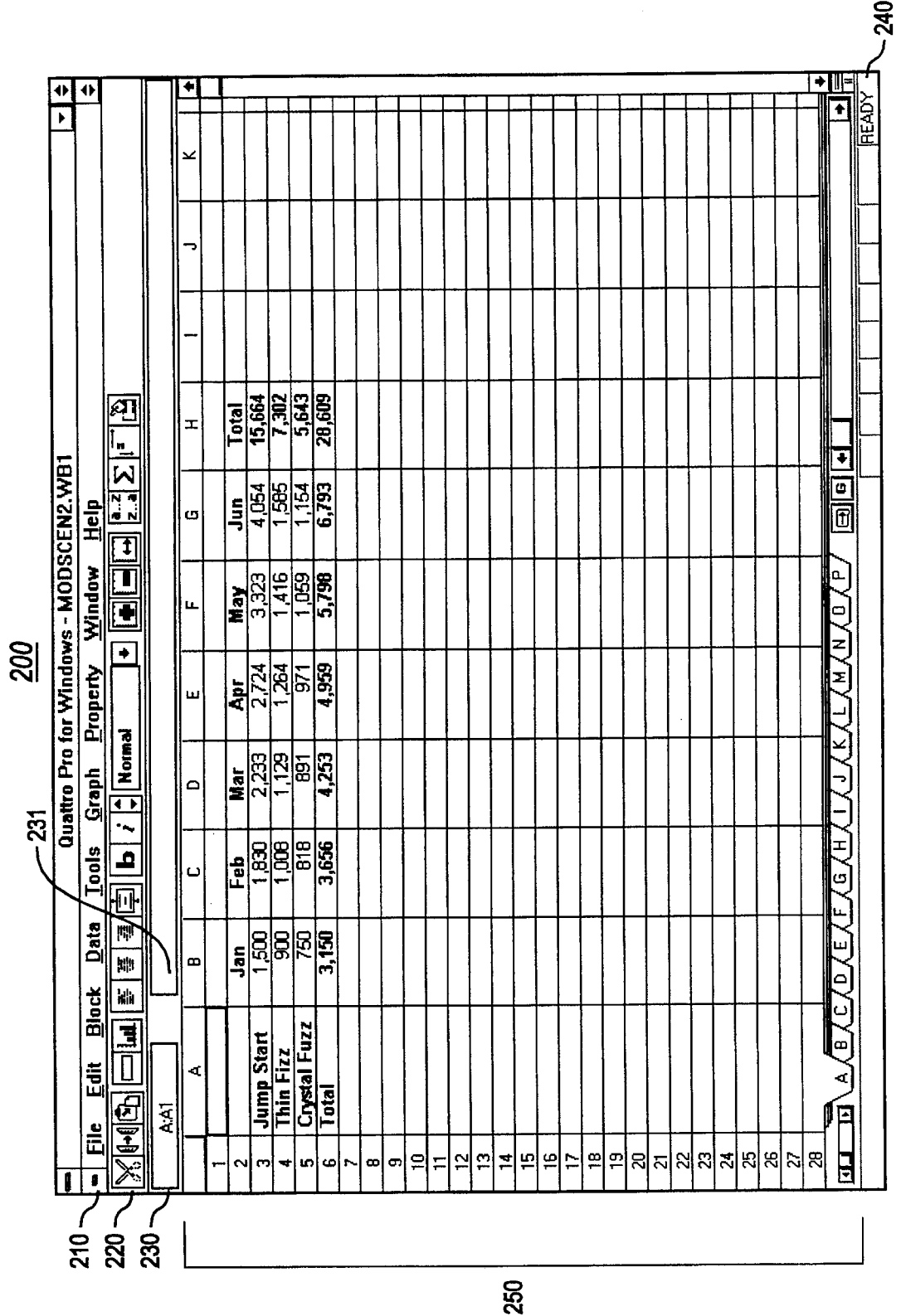
FIG. 2A is a screen bitmap illustrating a spreadsheet notebook interface employed in a preferred embodiment of the present invention; a sample "spreadsheet" has been loaded.

The spreadsheet system 130 includes a preferred notebook interface 200, shown in FIG. 2A, for receiving, processing, and presenting information, including alphanumeric as well as graphic information. Notebook workspace 200 includes a menu bar 210, a toolbar 220, a current cell indicator 230, an input line 231, a status line 240, and a notebook workspace 250. The menu bar 210 displays and invokes, in response to user inputs, a main level of user commands. Menu 210 also invokes additional pulldown submenus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY"

indicator means that the system is ready for the user to select another task to be performed.

Figure 2B:
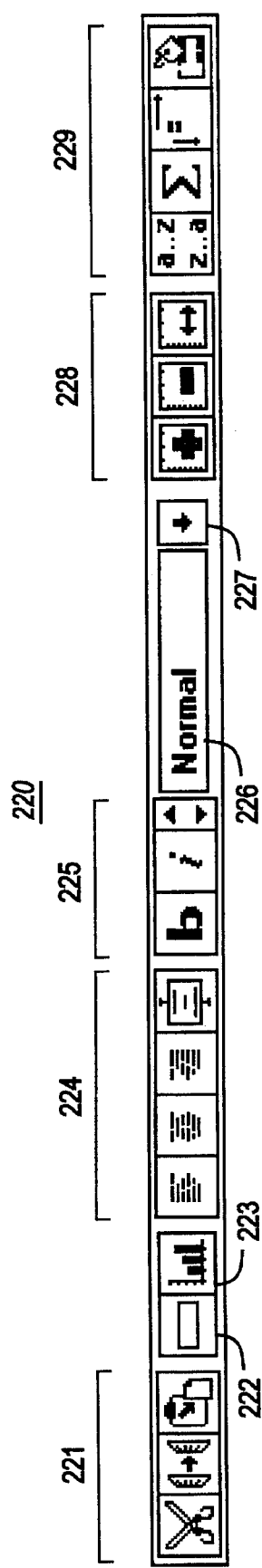
FIG. 2B is a bitmap of a toolbar component of the interface of FIG. 2A.

The toolbar 220, shown in further detail in FIG. 2B, comprises a row or palette of tools which provide a quick way for the user to choose commonly-used menu commands or properties. In an exemplary embodiment, toolbar 220 includes cut, copy, and paste buttons 221, a power button tool 222, a graph tool 223, alignment buttons 224, font buttons 225, a style list 226 with pulldown 227, insert/delete and fit buttons 228, and action (e.g., sort, sum, and the like) buttons 229. The functions of these buttons are suggested by their names. For instance, buttons 221 cut, copy, and paste data and objects to and from Windows' clipboard. Tool 222 creates "powerbuttons" which allow a user to run spreadsheet macros; in a specific embodiment, powerbuttons appear as floating objects in a layer above spreadsheet cells. In a similar fashion, the graph tool 223 creates floating graphs that appear above spreadsheet cells.

The notebook, which provides an interface for entering and displaying information of interest, includes a plurality of spreadsheet pages. Each page, such as page A shown in notebook workspace 250, may include conventional windowing features and operations, such as moving, resizing, and deleting. In a preferred embodiment, the notebook includes 256 spreadsheet pages with one Graphs page, all of which are saved as a single disk file on the mass storage 107. Workspace 200 may display one or more notebooks, each sized and positioned (e.g., tiled, overlapping, and the like) according to user-specified constraints.

Each spreadsheet page, in turn, includes a 2-D matrix of spreadsheet cells, arranged as a rectangular grid comprising columns and rows. At the intersection of a column with a row is a single cell. A cell is a location where the user can enter data, formulas, and the like. Each cell is identified by an address determined by the column and row that contain it; in other words, the letter and number that make up the address are the cell's coordinates. Each column of cells is identified by a letter. Columns are marked with letters A–Z, then AA–AZ, BA–BZ and the like, up to IA–IV in a preferred embodiment. Each row of cells is identified by a number. Rows are marked with numbers ranging from 1 to 8192, in a preferred embodiment. Thus, for example, the cell in the top left corner is cell A1.

A highlighted rectangle or "cell selector" is provided for indicating a currently active one (i.e., the cell that is currently selected). This is the cell that will be affected by the next action, such as entering a value. The column containing the cell selector appears on the border in reverse video (or in a contrasting color on a color screen); the row containing the cell selector appears in reverse video or a contrasting color, depending on the monitor. The user can move the selector to any cell in the spreadsheet.

To enter information in the spreadsheet, the user typically moves the selector to a desired cell (e.g., with a screen cursor 185 or keyboard 102) and types in the entry. The characters typed in appear on the input line. When the entry is complete, the user presses Enter or an arrow key (Right arrow, Left arrow, PgUp, or the like). The system 130 writes the value into the current cell, erasing any previous entry. If the user enters the data by pressing an arrow key, the selector moves in the appropriate direction.

Multiple cells may be selected for aggregate operations. In particular, a cell "block" is defined as a rectangular group of cells identified by the cell addresses of two opposite corners—usually the upper left and bottom right cells. In response to user movement signals from the pointing device 105, the cursor may be "dragged" across a range of cells for selecting a block, as is known in the art. Blocks may include contiguous or adjacent cells or ones which are non-contiguous. Once selected, blocks may be used in commands and formulas to act on several cells at once.

Figure 2C:
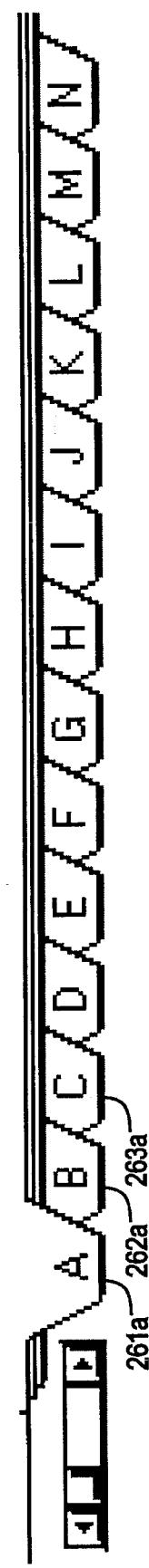
FIGS. 2C–D are bitmaps illustrating page identifiers for rapidly accessing and manipulating individual pages of the notebook interface.
Figure 2D:
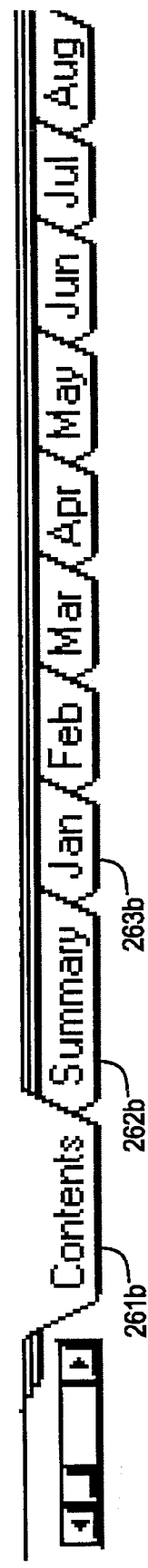

Since a notebook may include a plurality of 2-D spreadsheets or pages, the notebook interface includes an identifier for each page. As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a bottom edge of the notebook. Each tab member may include representative indicia, such as textual or graphic labels, including user-selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: he or she simply selects the tab corresponding to the page (as one would do when selecting a page from a paper notebook).

A general description of the features and operation of the spreadsheet notebook interface may be found in Quattro® Pro for Windows (*Getting Started, User's Guide and Building Spreadsheet Applications*), available from Borland International; additional description may be found in U.S. patent application Ser. No. 07/866,658, commonly owned by the present assignee. General description of the features and operation of a windows-based system, such as Microsoft Windows, is known in the art; see, e.g., Petzold, C., Programming Windows, Second Edition, Microsoft Press, 1990. Additional information can be found in Microsoft's Window Software Development Kit, including: 1) Guide to Programming, 2) Reference, Vols. 1 and 2, and 3) Tools, all available from Microsoft Corp. of Redmond, Wash. The disclosures of each of the foregoing are hereby incorporated by reference.

Data Modeling

A. Introduction

Data Modeling module 136 provides users with a powerful analytical tool for producing easily manipulated reports from spreadsheet notebook data. Data Modeling module 136 includes a Data Modeling Desktop (described in further detail below) which allows a user to quickly view data from many different perspectives, simply by clicking and dragging rows and columns of data to rearrange a report. In this manner, the Data Modeling module 136 allows a user to experiment with different types of reports for one's data set.

B. Modeling 2-D spreadsheet data

Figure 3A:
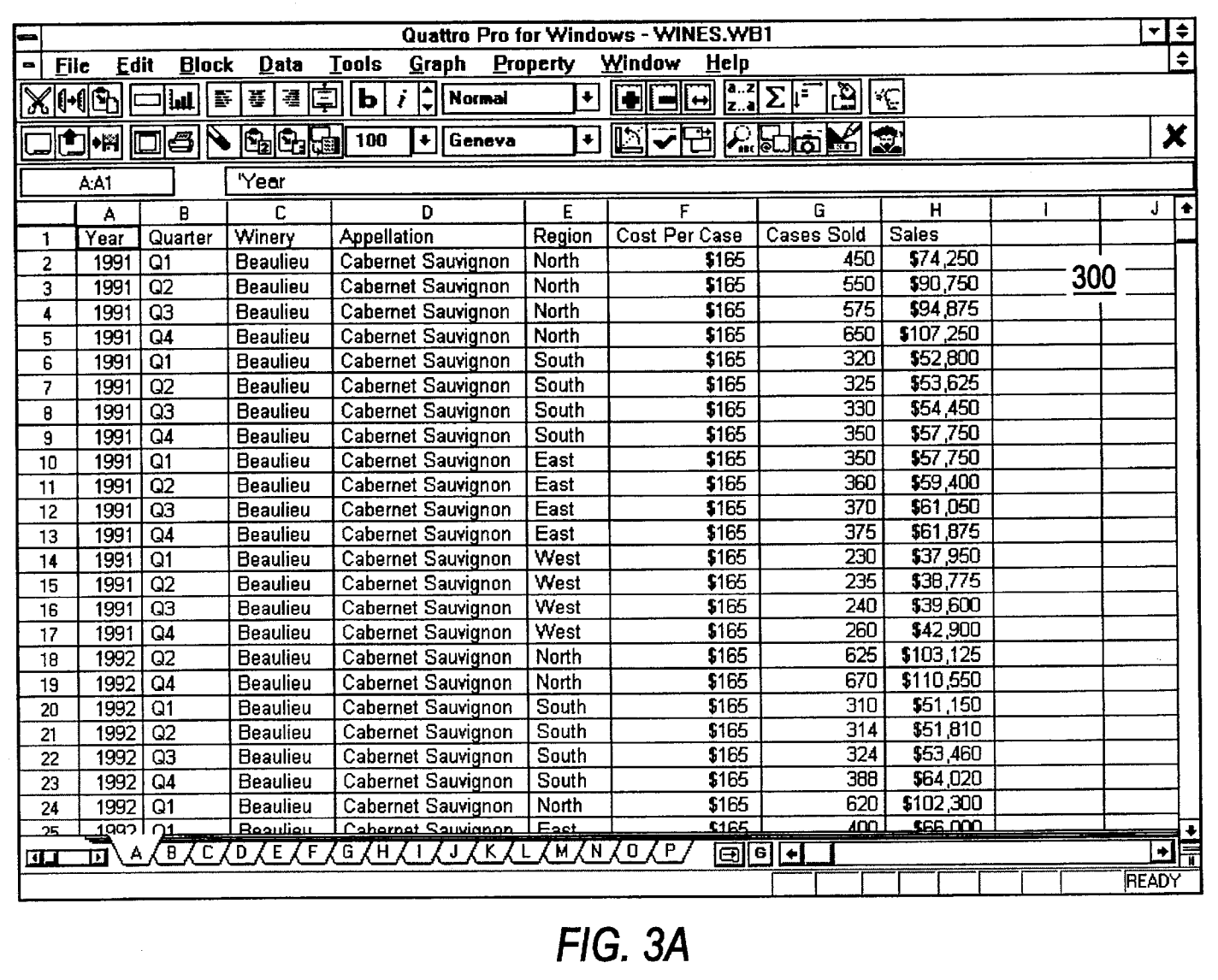

Spreadsheets let users categorize data to facilitate analysis. For instance, a lump sum of sales data is, by itself, of limited use. If it were broken down by quarter and year, however, then one may begin to analyze trends. When broken down further by product type and sales region, more sophisticated analysis becomes possible. FIG. 3A illustrates such a spreadsheet.

Spreadsheet 300 contains sample sales data for two wineries, arranged as just described. As shown, the spreadsheet is arranged in tabular format—like a table. The information could be more effectively analyzed if rows of data were transformed into easy-to-read reports. For this purpose, the Data Modeling module 136 creates cross-tabular reports that highlight different aspects of the user data. A cross-tabular report is created from the perspective of two or more of the characteristics associated with each piece of data in tabular format. For instance, each row of sales data in the spreadsheet 300 (e.g., "Cases Sold" and "Sales") can be characterized by the values from the same row of the Winery, Appellation, Year, Quarter, and Region columns.

Figure 3B:
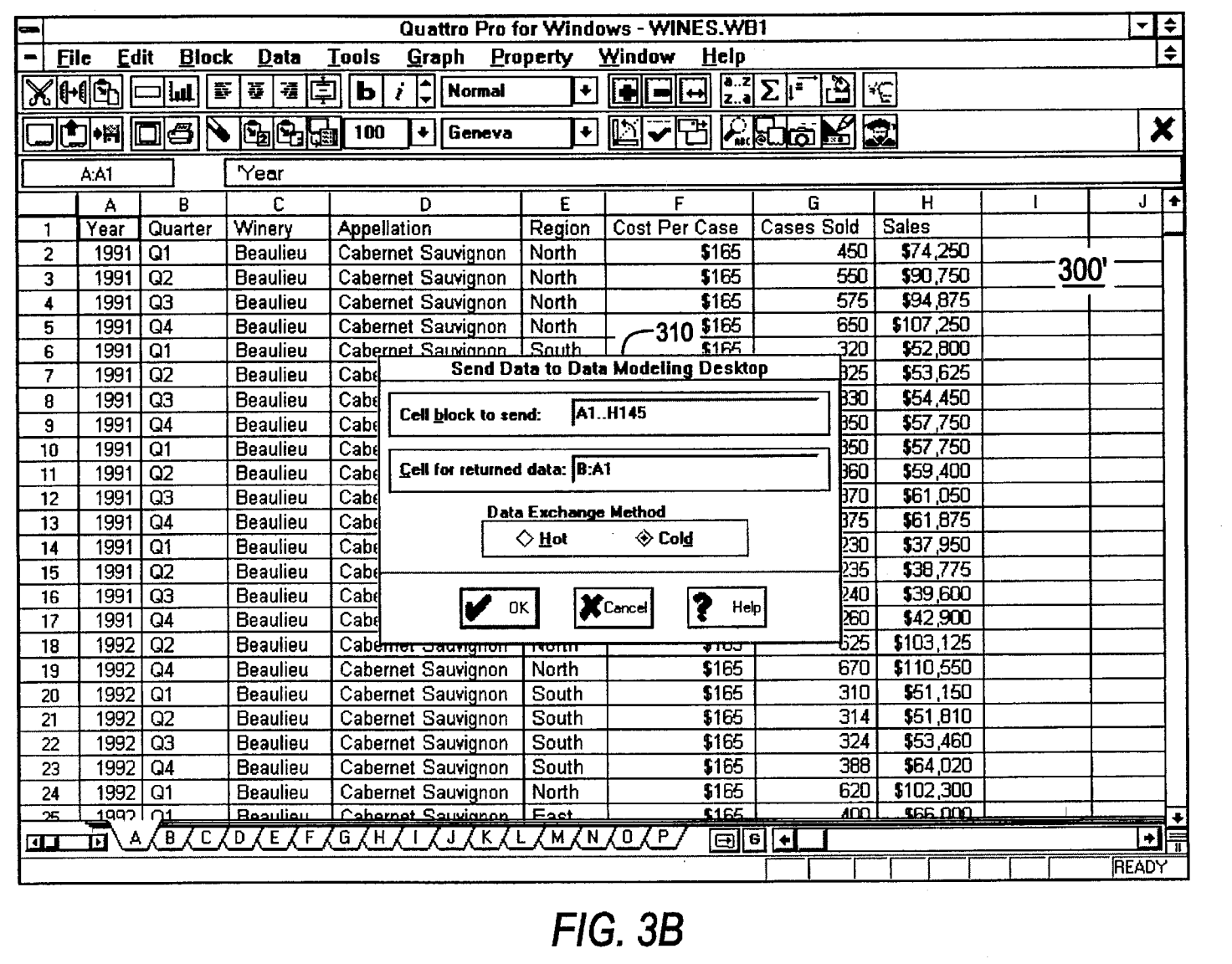

The process of creating cross-tabular reports using the Data Modeling module 136 is perhaps best illustrated by example. The user starts a Data Modeling session by choosing Data|Data Modeling Desktop from the system menu 200 (of FIG. 2A). As shown in FIG. 3B, the system responds by displaying a Send Data dialog box 310. Here, the user specifies spreadsheet notebook data to send to the Data Modeling Desktop and also indicates where, in this or another notebook, the system is to return the report. Additionally, the user can specify a "hot" link if he or she wants the report to be automatically updated with any changes that occur in the notebook source data; or the user can specify a "cold" link so that no such update is made. A "hot" link may be implemented using known methodology, such as Microsoft Windows Dynamic Data Exchange (DDE) or Object Linking and Embedding (ONE).

To send data from the Wines workbook (WINES.WB1) to the Data Modeling Desktop, the user has entered A1..H145 as a 2-D "block" of cell data to send. A 2-D block is a rectangular group of one or more cells and is identified by block coordinates, such as the cell addresses of its upper-left and bottom-right corners. A 2-D block is specified by selecting (e.g., with mouse 105 or keyboard 104) opposing block corners. A spreadsheet block of A1..H145, for instance, is defined by corner cells A1 and H145.

For the "Cell for returned data" edit field, the system defaults to the first blank page in the current notebook. For the example at hand, the user leaves this field unchanged at B:A1. The dialog is concluded by the user clicking the "OK" button, whereupon the system launches the Data Modeling Desktop.

Figure 4A:
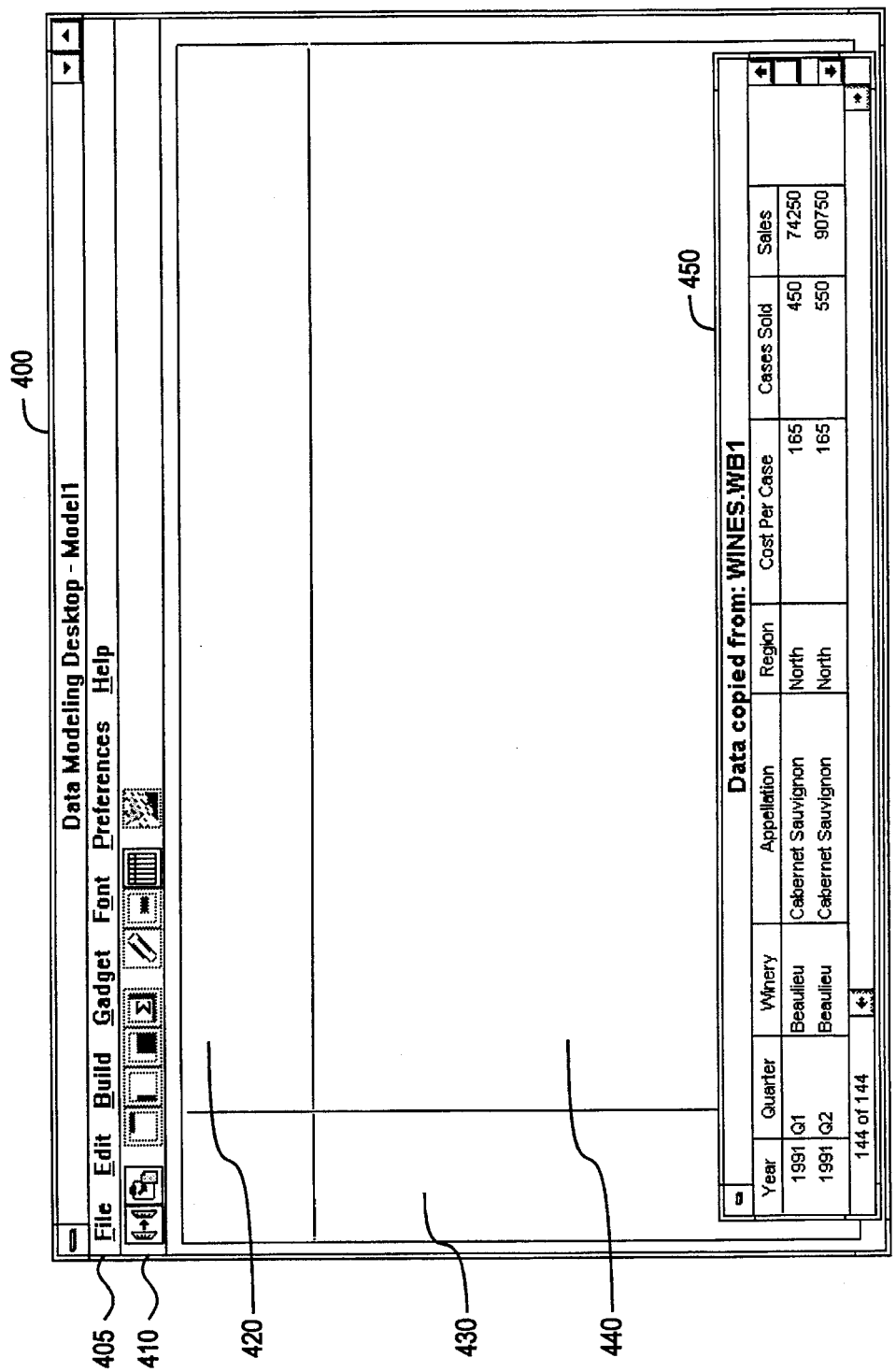
FIG. 4A is a bitmap screenshot illustrating a preferred interface of the Data Modeling Desktop of the present invention.

Shown in FIG. 4A, the Data Modeling Desktop 400 opens a new report for the user to begin working with. The data sent from the spreadsheet notebook appears in a Source Window 450, located at the bottom. This is the data which will be used to create a report. The title of the Source Window 450 displays the name of the spreadsheet notebook where this data originates.

As shown, the Data Modeling Desktop 400 includes a large blank work area divided into three sections of a report: Top Label Bar area 420, Side Label Bar area 430, and Report Data area 440. The Desktop 400 also includes a Data Modeling menu bar 405 and a Data Modeling toolbar 410, positioned above the work area.

Figure 4B:
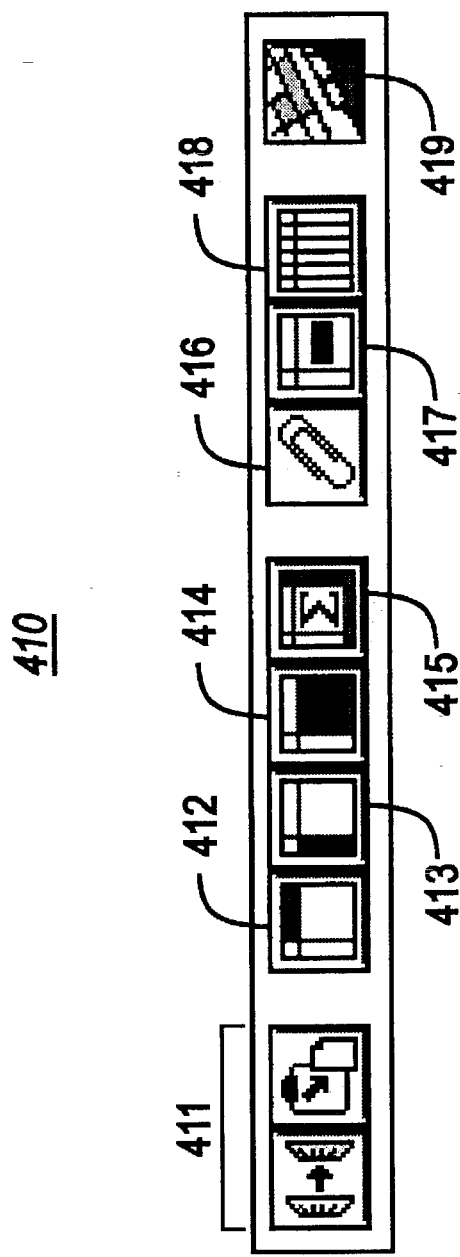
FIG. 4B is a detailed view of a toolbar from the Data Modeling Desktop of FIG. 4A.

The toolbar 410 includes tools, each represented by a screen button, for designing the layout of one's report. Each button has an equivalent command in the menu bar 405. Shown in further detail in FIG. 4B, the toolbar 410 includes Copy and Paste buttons 411, Top Label Bar button 412, Side Label Bar button 413, Report Data button 414, Total button 415, Group (paper clip) button 416, Remove button 417, Source Window button 418, and Copy to Spreadsheet Notebook button 419. The Copy button places the entire contents of either the Source Window or the report (depending on which is active) in the Windows clipboard (a region of shared memory made available to applications running in Microsoft Windows). The Paste button, in turn, pastes the contents of the clipboard to the Source Window. Top Label Bar button 412 creates a Top Label Bar for a report, from a selected column in the Source Window 450. Side Label Bar button 413 creates a Side Label Bar for a report, from a selected column in the Source Window 450. Report Data button 414 sums the values of a column in the Source Window 450 and places the results in the Report Data area 440. Total button 415 inserts a total in the report for a selected Top or Side Label Bar. Group (paper clip) button 416 combines data from user-selected labels together into one group (or, alternatively, ungroups grouped labels). Remove button 417 removes a user-selected item from the report (only); it does not affect source data. Source Window button 418 reveals the Source Window if it has been closed. Copy to Spreadsheet Notebook button 419 copies the Data Modeling Desktop report to a notebook.

Once the user's information has been sent to the Data Modeling Desktop 400, the user can proceed to create a report. In general, the user creates a report by first creating its Top and Side Label Bars. Then the user selects a column from the Source Window to use for Report Data. The particular steps and interface for this process will now be described with reference to FIGS. 4C–E.

Figure 4C:
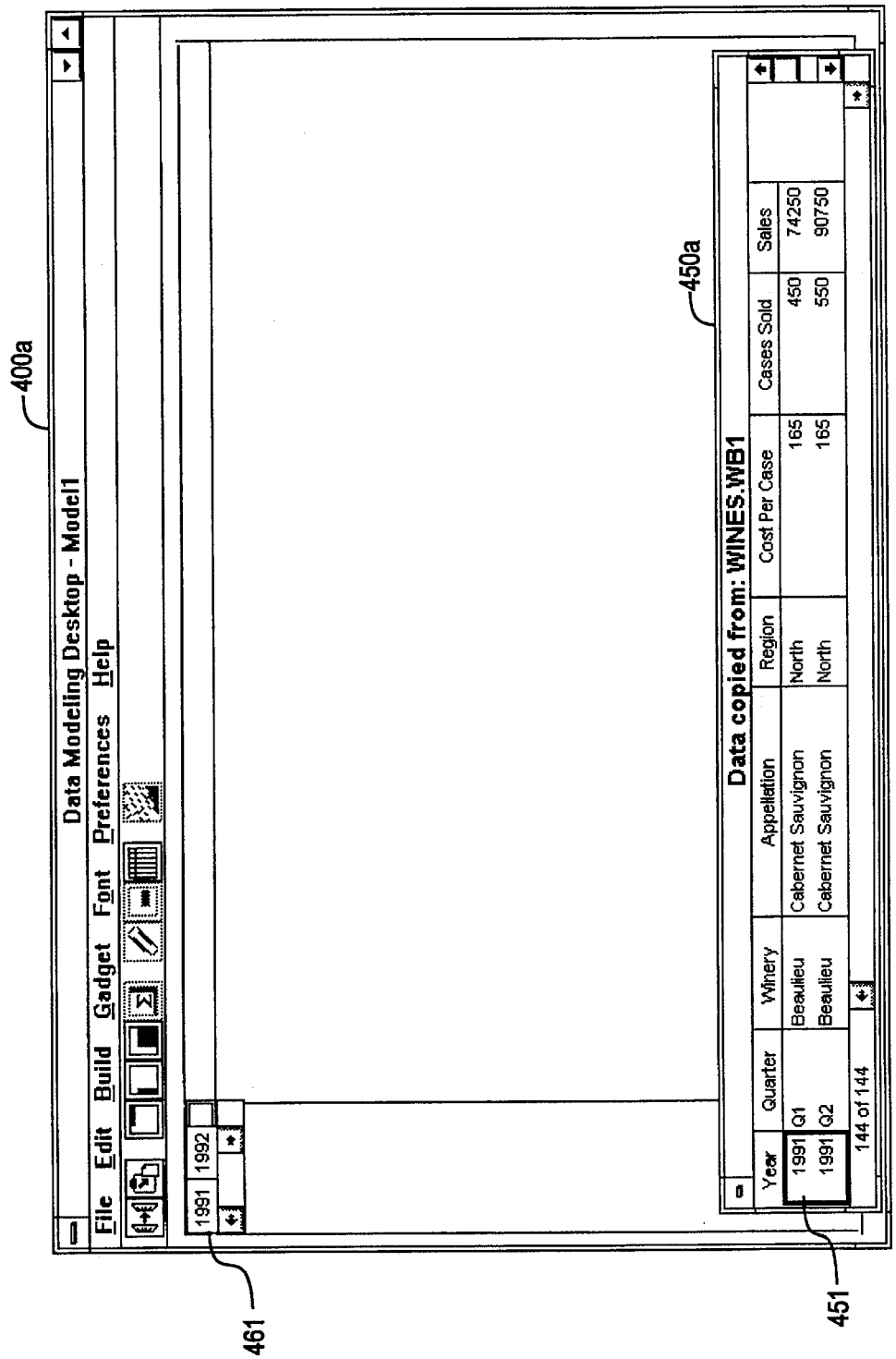
FIGS. 4C–F are bitmap screenshots illustrating construction of a multi-dimensional report from a data source (taken from the spread of FIG. 3A).

In FIG. 4C, the user creates a Top Label Bar for his or her report by collecting the data he or she wants as top labels and then clicking the Top Label Bar button 402. As shown in FIG. 4C, for instance, to create a Top Label Bar with the WINES.WB1 data, the user selects the Year column 451 in the Source Window 450 (shown as 450a) and then clicks the Top Label Bar button. The Data Modeling Desktop (shown as 400a) creates a Top Label Bar 461 from the values in the user-selected column (i.e., column 451) in the Source Window.

Figure 4D:
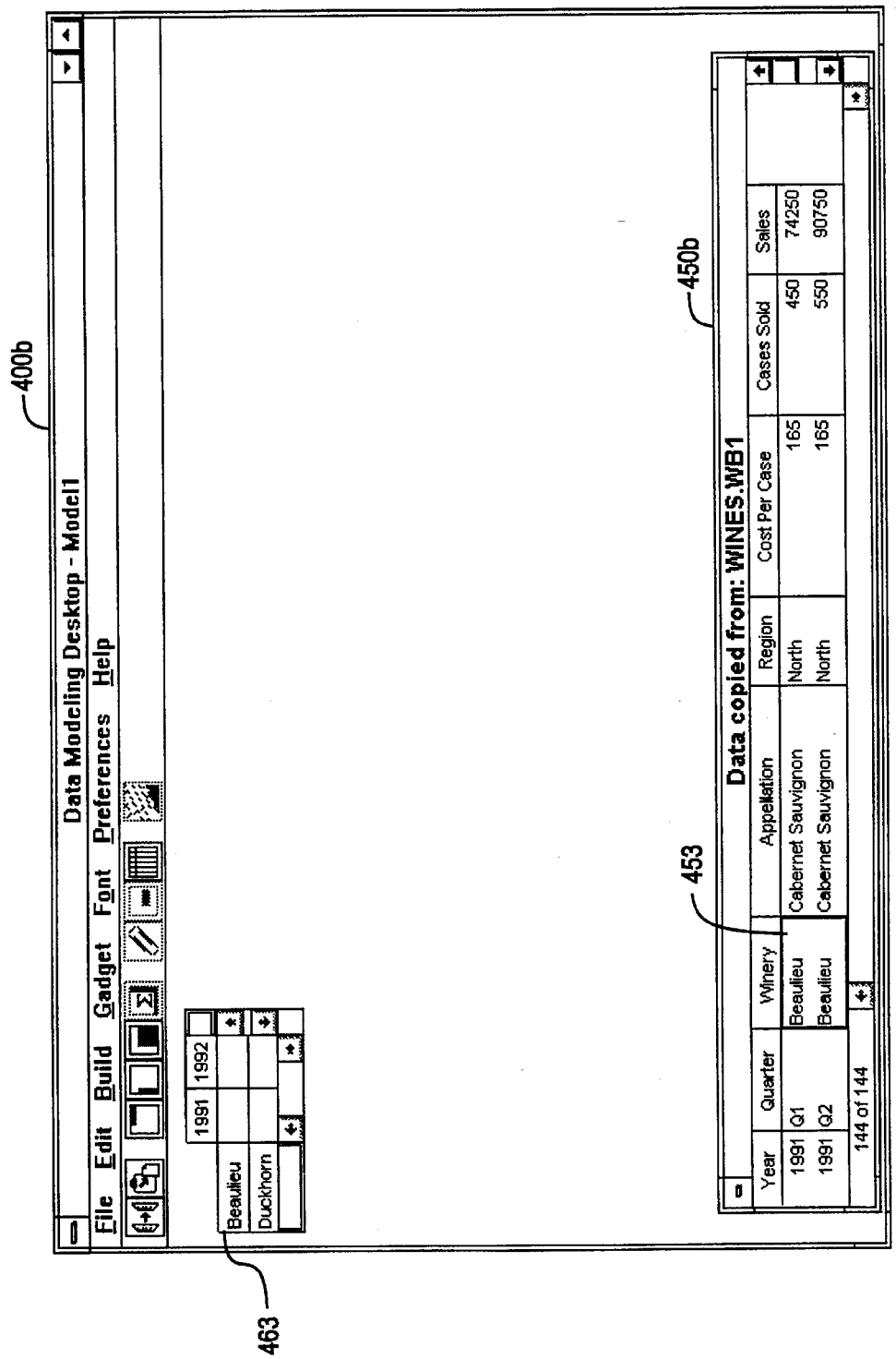
Figure 4E:
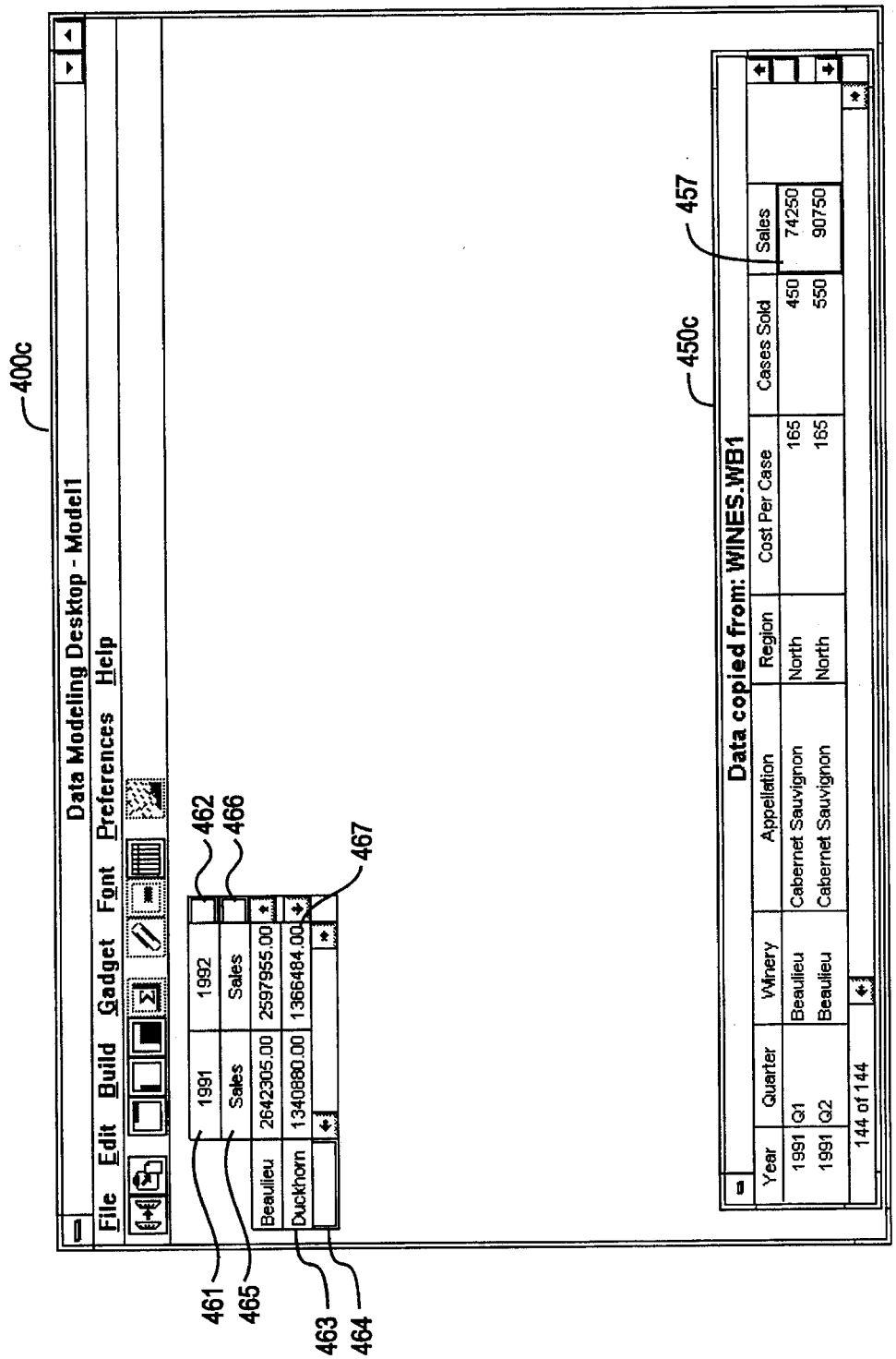

In a similar manner, the user may proceed to create a Side Label Bar for the report as follows. As shown in FIG. 4D, the user selects Winery column 453 from the Source Window (450b) and drags that column from the Source Window to the Side Label Bar area of the work area (the Side Label Bar button 413 is highlighted when a selected column is dragged to this area of the report window). As shown, Side Label Bar 463 has (in response to user action) been created with labels taken from values in the Winery column 453.

Next, the user proceeds to place data in the report by selecting a column of data in the Source Window and clicking the Report Data button (button 414). To place sales data from the Source Window into the report, for instance, the user selects Sales column 457 in the Source Window (450c) and clicks the Report Data button. In response, the Data Modeling Desktop (400c) sums all the rows in the Sales column for each Winery for 1991 and 1992 and places each result in a cell of the report. The Report Data labels ("Sales" for the present example) automatically appear beneath the Top Label Bar. Thus at this point, the user has created a report which includes a Top Label Bar 461, a Side Label Bar 463, a Report Data Label bar 465, and Report Data 467. As also shown, the Label bars 461, 463, 465 include pivot handles 462, 464, 466, respectively (which are described in further detail below).

Figure 4F:
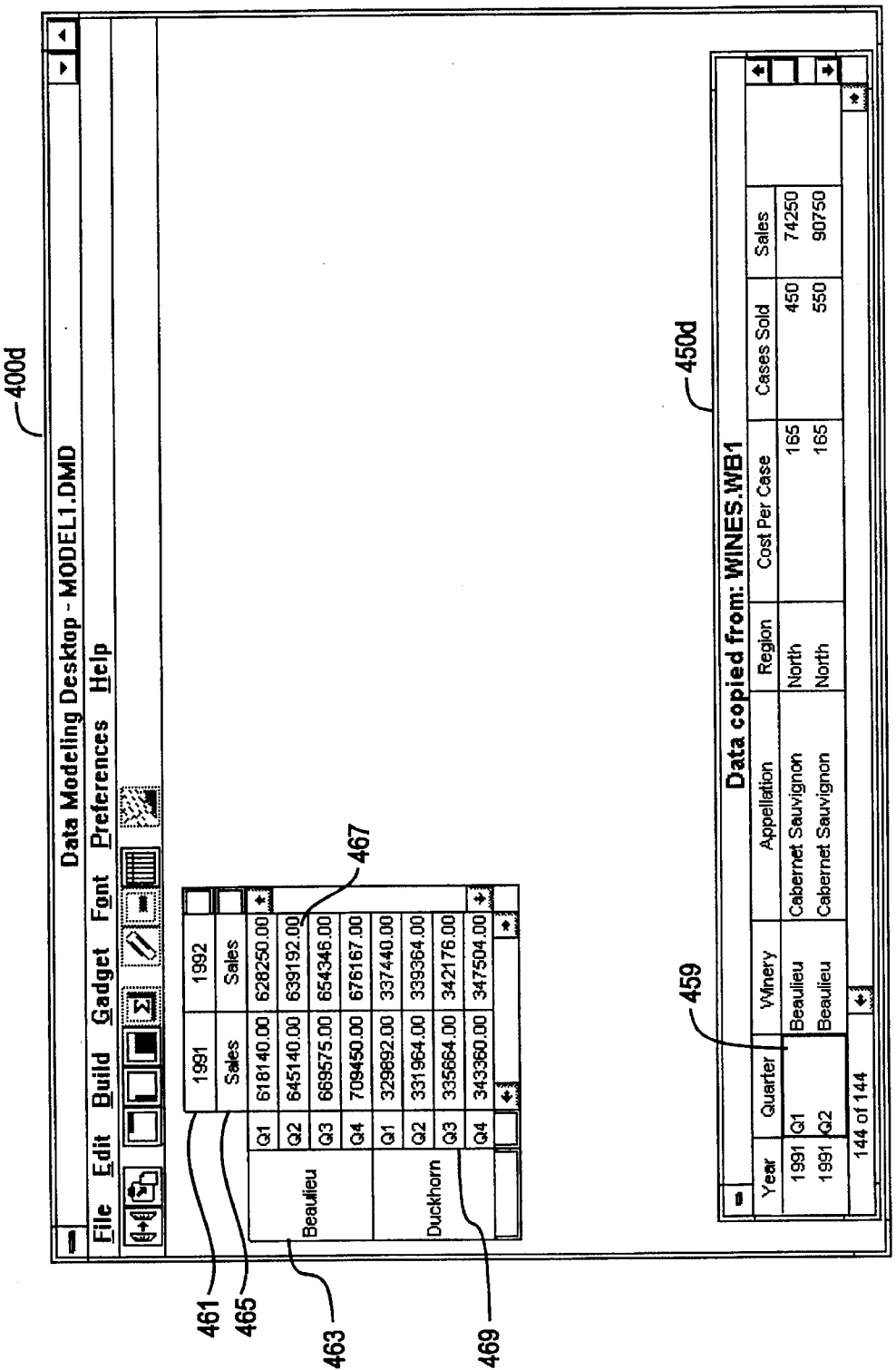

Now that the user has created the basic report, he or she can proceed to customize it. As shown in FIG. 4F, for instance, to break down the Sales data further by quarter, the user selects Quarter column 459 in the Source Window (450d) and clicks the Side Label Bar button (button 413 of FIG. 4B). The Data Modeling Desktop 400 recomputes the Report Data and displays the quarters of the year as another Side Label Bar (Bar 469). Now, the user can easily see the difference between quarters in 1991 and 1992.

Figure 5A:
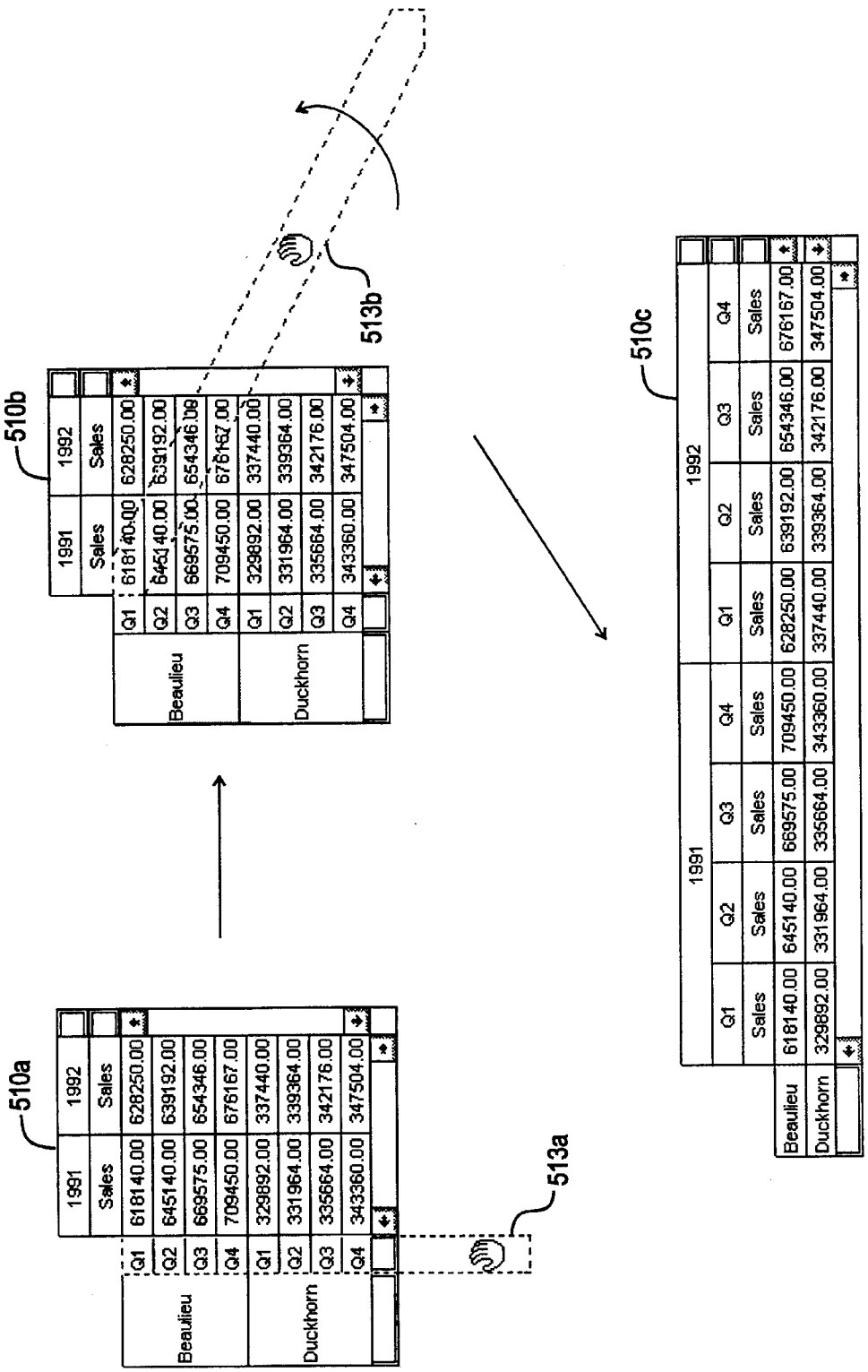

The user may now proceed to "pivot" label bars for reformatting the report. Pivoting a label bar reorganizes the Report Data, allowing the user to view it from a different perspective. As shown in FIG. 5A, a user can pivot a label bar by dragging its handle towards the opposite axis. A label bar handle is the tab that appears below a Side Label Bar, or to the right of a Top Label Bar; when the screen cursor (mouse pointer) is placed over a handle it becomes a hand, as shown.

To see the two-year trend of sales more easily, the user may pivot the Quarter Side Label Bar to rearrange the report by clicking the handle of the Quarter Side Label Bar and hold down the mouse button, and then dragging (pivot) the Side Label Bar up to a desired position in the report (e.g., beneath the 1991 and 1992 labels, as shown). As shown in the figure, the user pivots the Quarter label bar from a vertical position to a horizontal one by dragging (with a mouse device) the handle from position 513a, through position 513b, and continuing upward until positioned at a desired destination. As shown at 510c, the system, in response, reformats the report 510: the four corners of the year become a second Top Label Bar and all related data falls into place. Before pivoting the quarterly labels, sales were calculated for each winery quarterly by year, now sales are calculated for each winery annually by quarter.

Figure 5B:
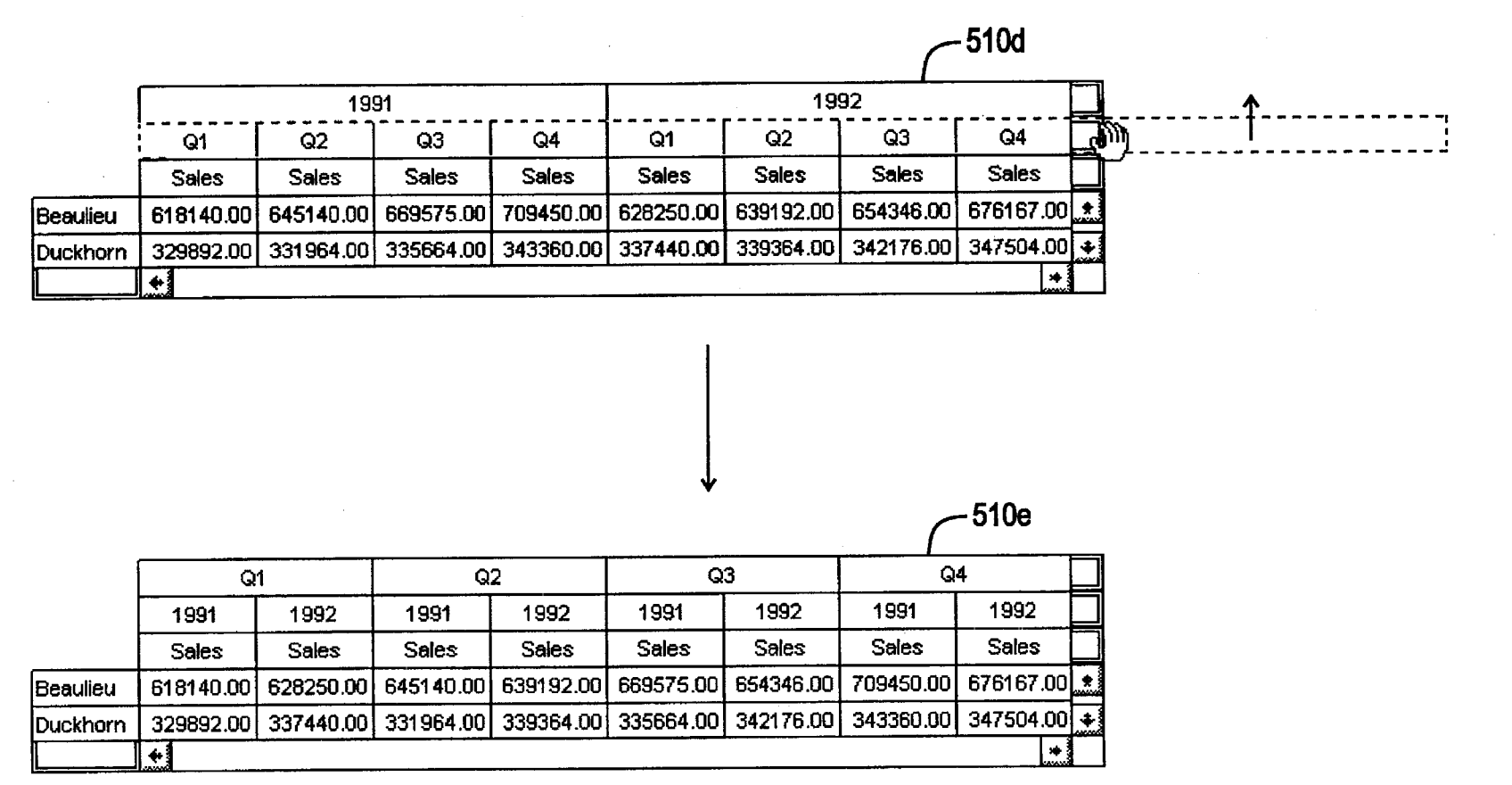

As shown in FIG. 5B, the user can also reorganize his or her Report Data by changing the level of a label bar, by just dragging a Top Label Bar up or down (or a Side Label Bar inward or outward). For example, to see sales broken down by quarter, the user may select the handle of the Quarter Top Label Bar (Q1, Q2, Q3, Q4) and drag it above the Year Top Label Bar (1991, 1992), as shown in the report sequence from 510d to 510e. Changing the position of these two Top Label Bars changes the position of Report Data. By pulling the Quarter label above the Year label bar, the user may rearrange the report to show annual sales for each quarter (instead of quarterly sales for each year).

FIGS. 5C–F illustrate additional reformatting of the report. For report 510f, shown in FIG. 5C, the Region column from the Source Window 450 has been added as an inward-most Side Label Bar. For the report 510g of FIG. 5D, on the other hand, the Region Side Label Bar has been moved outward. As final examples for the spreadsheet data 300, FIGS. 5E–F illustrate changes to the Report Data area of the report 510. In FIG. 5E, the Report Data has been changed to show Cases Sold in report 510h. In report 510i of FIG. 5F, on the other hand, the Report Data area has been changed to show both Sales and Cases sold.

C. Modeling three-dimensional spreadsheet data

1. Selecting 3-D spreadsheet data

Figure 6A:
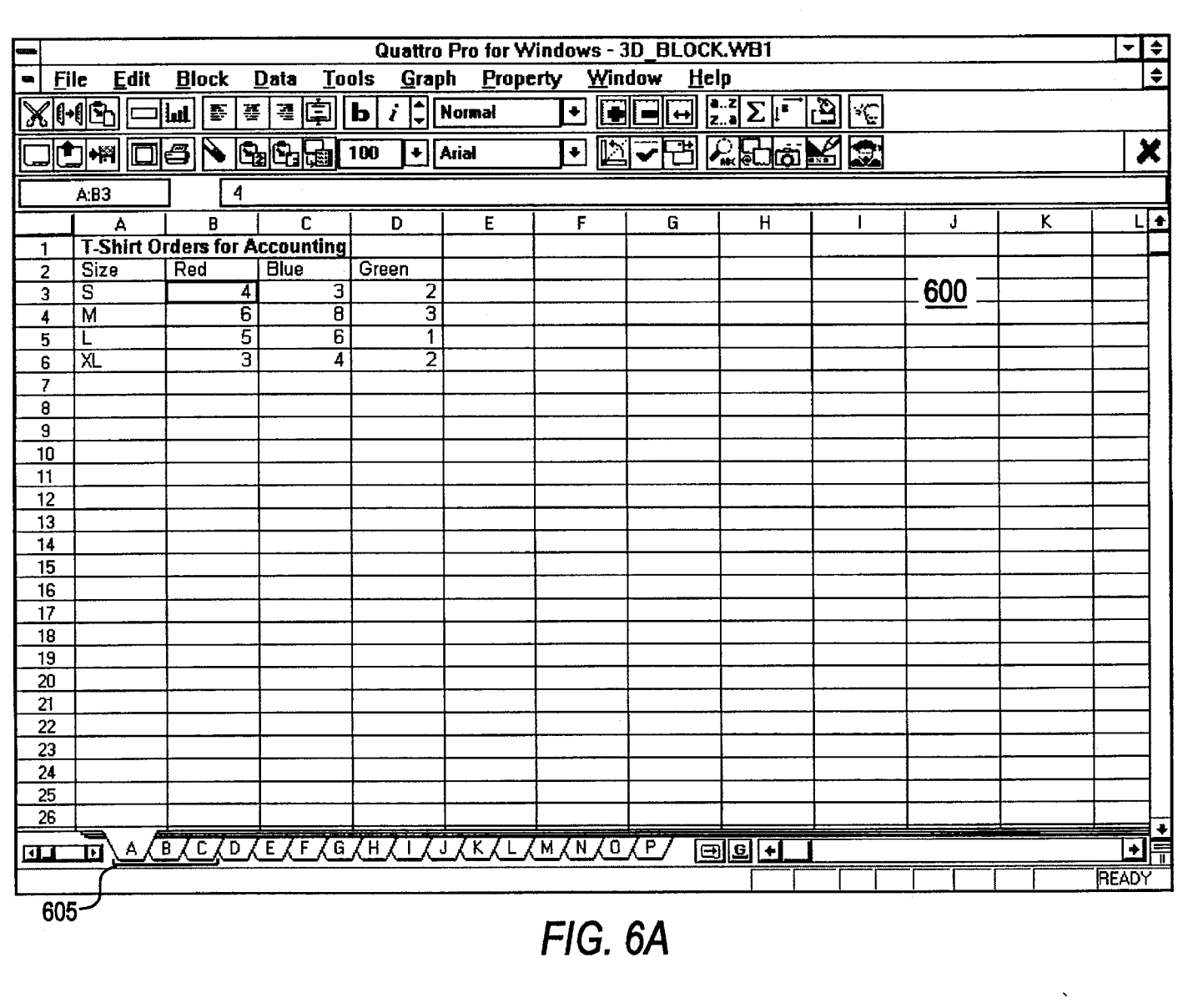
Figure 6B:
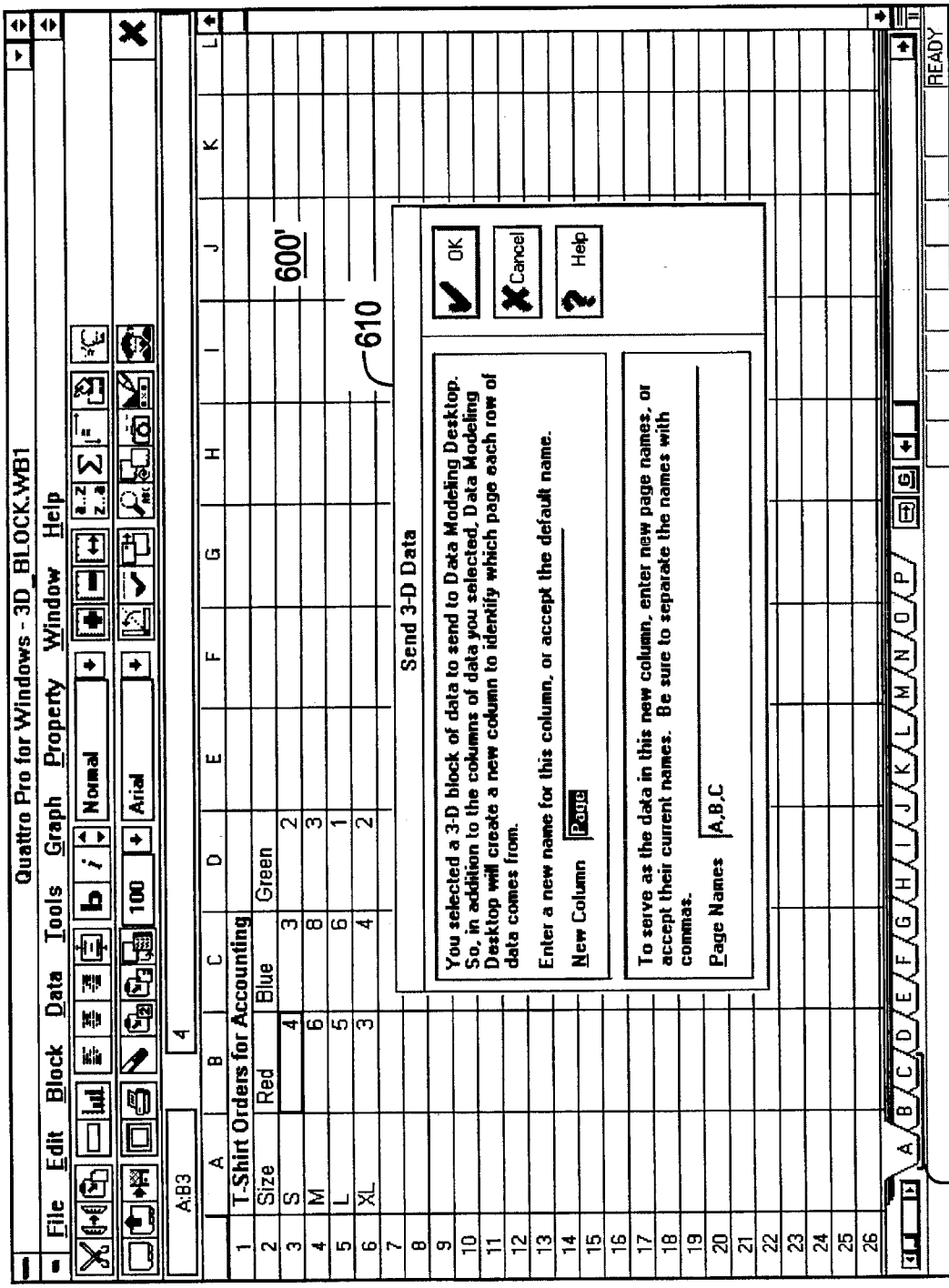
FIG. 6B is a bitmap screenshot illustrating a preferred interface for sending a 3-D block of spreadsheet data to the Data Modeling module of the present invention.

In addition to sending 2-D blocks of spreadsheet data to the Data Modeling Desktop, as previously described, the system of the present invention allows users to send 3-D dimensional blocks of spreadsheet data, for multidimensional analysis and reporting. As shown in FIG. 6A, for instance, spreadsheet notebook 600 includes T-shirt sales information for a hypothetical company, where the particular data for each department of the company (i.e., Departments A, B, and C) are stored separately on individual pages of the spreadsheet notebook (i.e., page A, B, and C).

Selection of 3-D cell blocks, i.e., cell ranges spanning more than one page, occurs in a fashion similar to that previously described for 2-D blocks. To extend a 2-D block into a 3-D block, the user specifies an additional or third dimension by selecting an appropriate page identifier. If the user selects the C page tab while a block on page A is selected (e.g., with a SHIFT or other status key), the 2-D block is extended into a 3-D block spanning from Pages A to C. A spreadsheet block of A..C:C5..F14, for instance, is defined by corner cells A:C5 and C:F14. Additionally, pages may be grouped together, thereby providing a means for changing multiple pages simultaneously. In much the same manner as cells from a spread are grouped into 2-D blocks, a range of pages are grouped by specifying beginning and ending members. Once grouped, a page of the group may have its operations (e.g., selection, data entry, and the like) percolate to the other members of the group, as desired.

2. Sending 3-D spreadsheet data

Figure 6C:
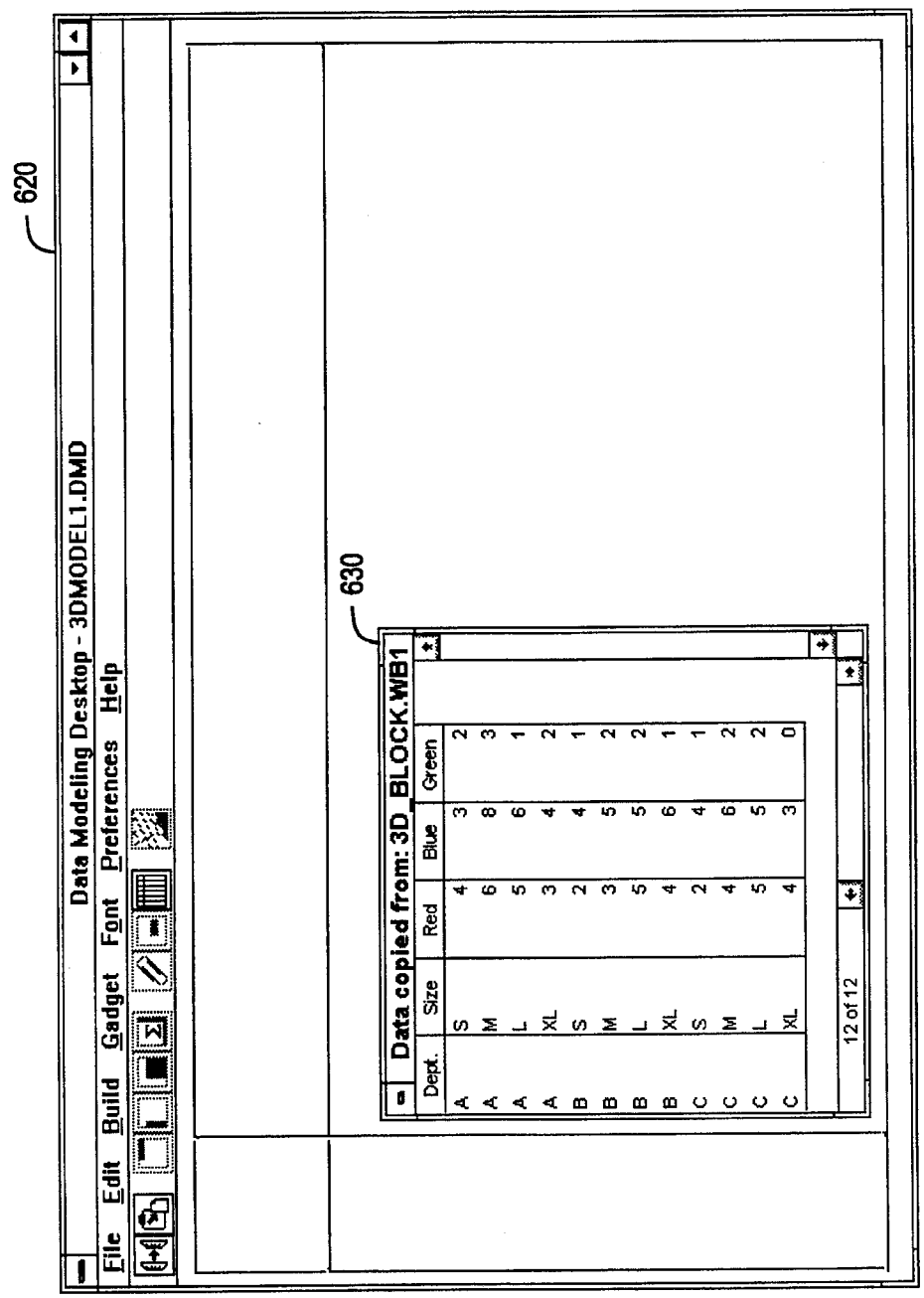
FIGS. 6C–D are bitmap screenshots illustrating creation of a multi-dimensional report from the 3-D block (taken from the spreadsheet notebook of FIG. 6A).

Once a 3-D block of data has been selected for multi-dimensional analysis, the user invokes the Data|Data Modeling Desktop command, previously described. The system, in response, automatically recognizes that a 3-D block has been specified and displays Dialog 610, shown in FIG. 6B. As indicated by the dialog, the Data Modeling Desktop will create, in addition to the columns of data the user has selected, a new column to identify which page each row of data comes from. For this new column, the user may enter a new name (e.g., "Dept."), or accept a default name (e.g., "Page"). Upon the user confirming the dialog (e.g., clicking the "OK" button), the system sends the 3-D block of data to the Data Modeling Desktop. As shown in FIG. 6C, for instance, Data Modeling Desktop workspace 620 includes a Source Window 630 storing the 3-D block of information. The first column of the Source Window 630, which has been named "Dept." by the user, stores corresponding page identifiers (e.g., A, B, and C) for the data.

Figure 6D:
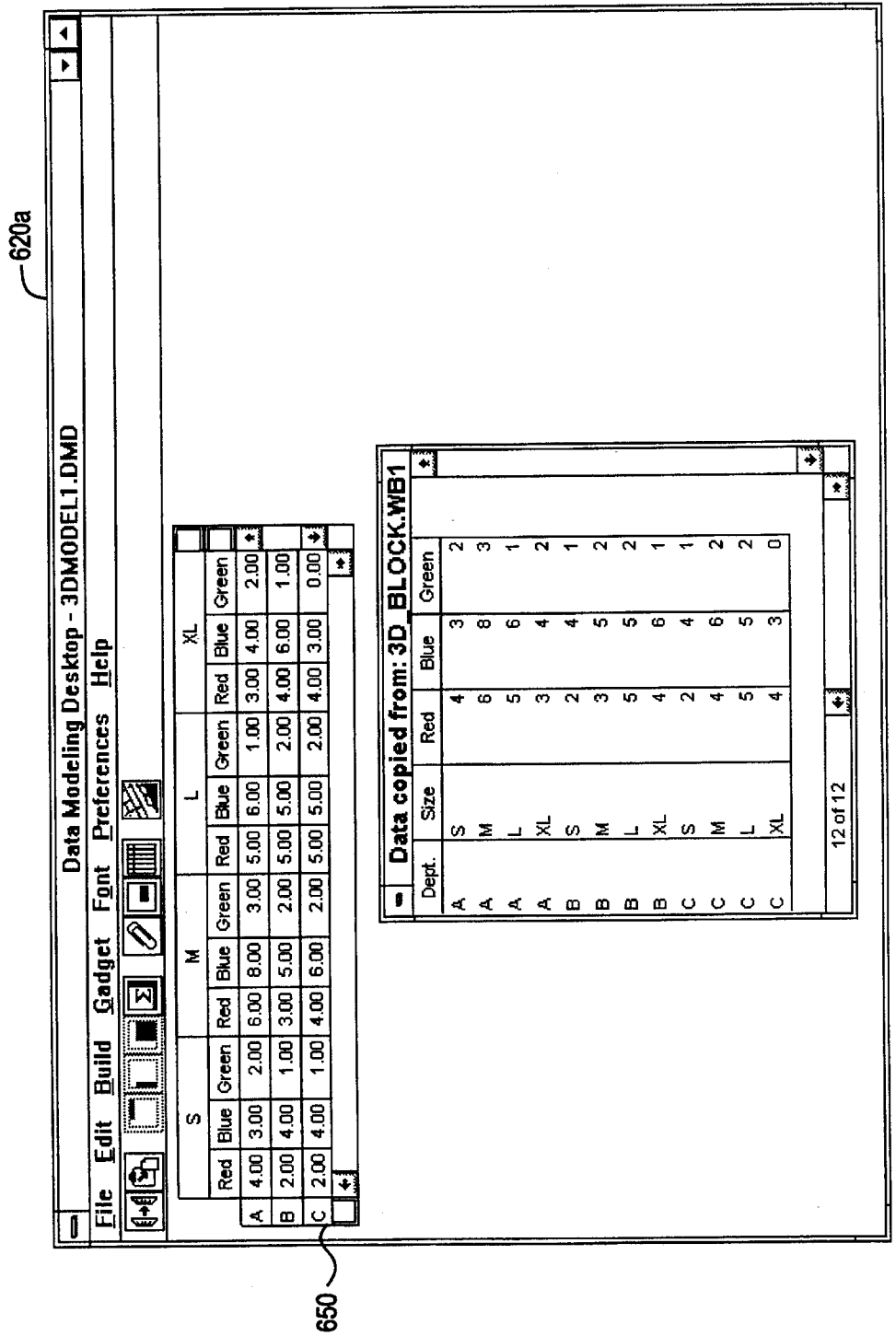

After the 3-D block of information is transformed (described below) into multi-dimensional format, the user may now proceed to quickly create a multi-dimensional report, such as report 650 of FIG. 6D, using the previously described click-and-drag techniques. As shown in FIGS. 6E–K, the user may interactively modify the multi-dimensional report until the desired format is achieved.

3. Transforming 3-D spreadsheet data

Figure 7A:
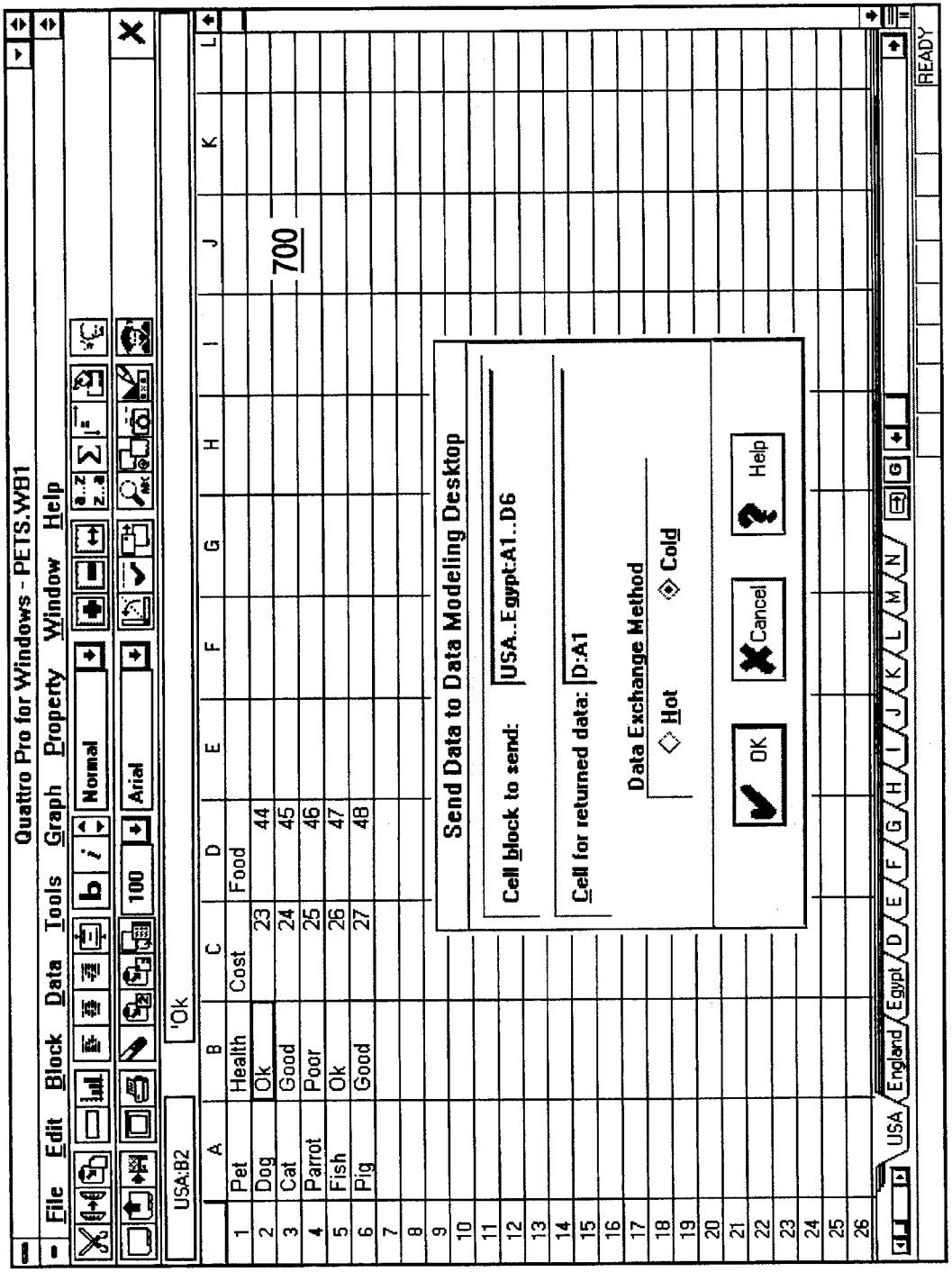
FIG. 7A is a bitmap screenshot illustrating another example of a three-dimensional spread of information, stored in three consecutive pages of a spreadsheet notebook.

FIG. 7A shows a second 3-D block of spreadsheet data from a spreadsheet notebook which will serve to illustrate transformation of 3-D spreadsheet information, in accordance with the present invention. Spreadsheet 700 includes various information about pets (e.g., health, cost, food) categorized by country, with each country appearing on a separate page of a spreadsheet notebook. Upon the user sending the block USA..Egypt:A1..D6 to the Data Modeling Desktop, the system automatically generates a Source Window for the 3-D block, as shown in the workspace 710 of FIG. 7B. Again, the first column of the Source Window, here named "Country" by the user, stores corresponding page identifier information (e.g., USA, England, and Egypt) for the data. As before, the user may now proceed to easily create a multi-dimensional report using the aforementioned click-and-drag techniques.

Figure 8:
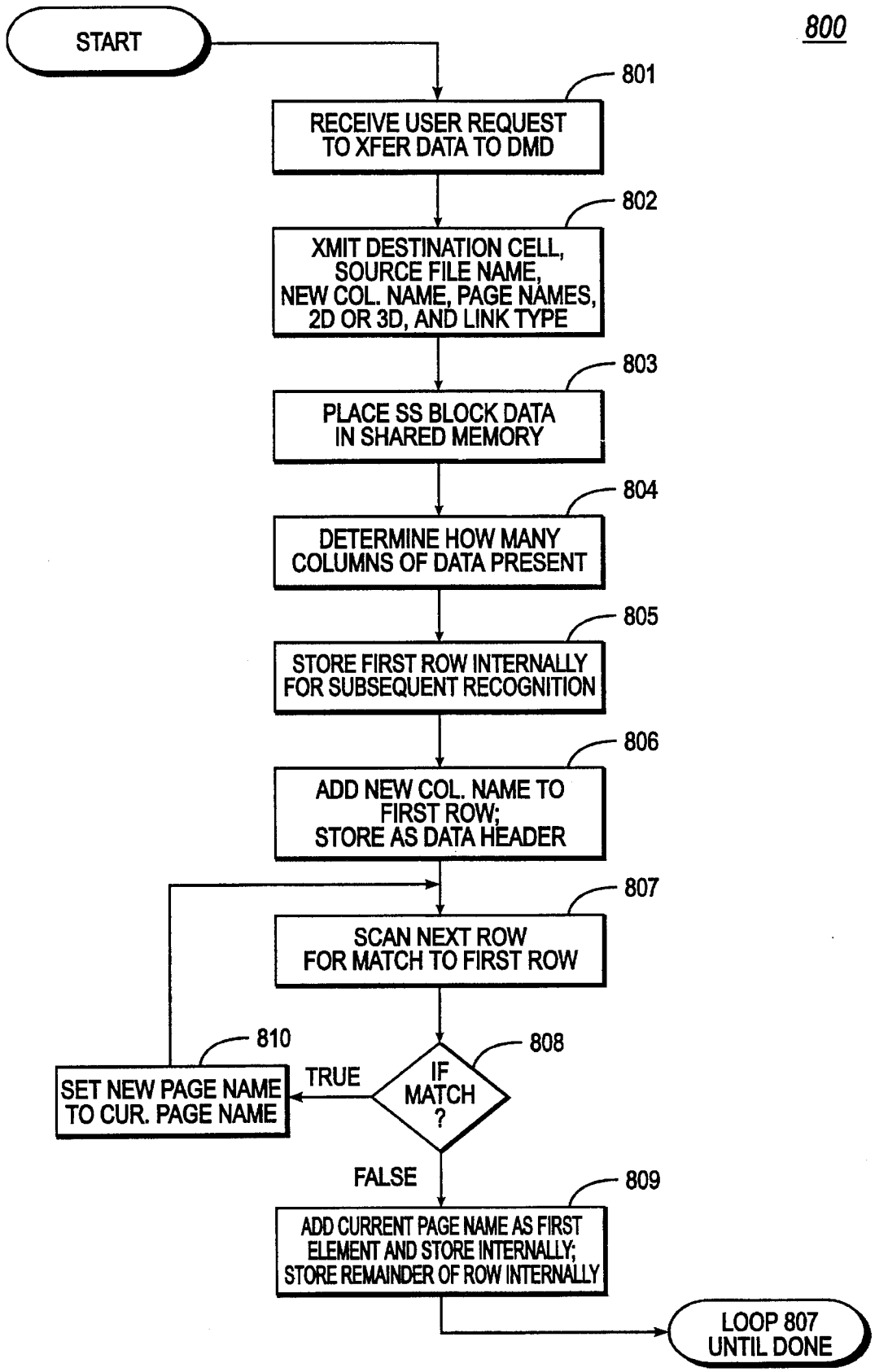
FIG. 8 is a flowchart illustrating a method of the present invention for transforming a 3-D block of spreadsheet data (taken from a spreadsheet notebook) into a format which is suitable for use with multi-dimensional reporting.

Referring now to FIG. 8, a method 800 of the present invention for transforming the user-selected 3-D block of information cells from spreadsheet 700 into a source data window suitable for use in multi-dimensional reporting will now be described. At step 801, the system receives a user request to transfer data to the Data Modeling Desktop (DMD). At step 802, the system transmits a destination cell (of where to return the information), a source file name, a new column name, page names, whether the source block is 2-D or 3-D, and link type (i.e., "hot" or "cold"). At step 803, the spreadsheet block data is placed in shared memory, such as Windows' clipboard, where it may be accessed by the Data Modeling Desktop workspace.

At step 804, the system determines how many columns of data are present. Next, at step 805, the system stores a first row internally for recognition of boundaries (between pages); alternatively, the source data may include page breaks (e.g., spreadsheet page break characters) for separating page boundaries. At step 806, the system adds the (user-specified) new column name to the first row, and stores it as a data header. At step 807, the system scans the next row to determine whether it matches the first row (i.e., contains the same data header). If a match is found at step 808, the method proceeds to step 810 to use the next page name as the data header, and then loops to step 807 to examine subsequent rows. If a match is not found (i.e., normal case), however, at step 808, the method proceeds to step 809 to add the current page name as the first element in the Source Window table. After step 809, the method loops back to step 807 until all data members have been examined.

Attached hereto is an Appendix containing source code listings providing further description of the method of the present invention, which is suitable for implementation in a general purpose digital computer system such as an IBM-compatible personal computer. A suitable compiler for compiling the code is available from several vendors, including Borland International of Scotts Valley, Calif.

While the invention is described in some detail with specific reference to a single preferred embodiment and certain alternatives, there is no intent to limit the invention to that particular embodiment or those specific alternatives. For instance, those skilled in the art will appreciate that the teachings of the present invention are not restricted to just spreadsheet cells but may be advantageously applied to other types of data records, such as tuples of a database table. Thus, the true scope of the present invention is not limited to any one of the foregoing exemplary embodiments but is instead defined by the appended claims.

---

APPENDIX: 3-D to 2-D Transformation

---

```
/*
Exemplary transformation routine
Copyright © 1994 Borland International
*/
/*
    The user asks for a transfer of data to DMD and after several
    dialogs are handled, QPW sends the following info to DMD:
    the result cell, the name of the QPW file, the new column name
    (in this example it might be Country), the page names
    (elements of the new column, in this example this is USA,
    England, and Egypt), whether this data is 3 dimensional or
    not, and the type of link requested (a live DDE link or just a
    normal copy).
*/
    mswppc_get_qpw_args (qpwDest, g->qpwResCell, g->qpwFileName,
        g3DConstName, g3DPageTitles,
        &gQpw3Dimensional, &linkType);
/*
    The data which QPW has placed on the clipboard looks like:
        Pet             Health          Cost            Food
        Dog             Ok              23              44
        Cat             Good            24              45
        Parrot          Poor            25              46
        Fish            Ok              26              47
        Pig             Good            27              48
        Pet             Health          Cost            Food
        Dog             Ok              12              44
        Cat             Good            13              45
        Parrot          Poor            14              46
        Fish            Ok              15              47
        Pig             Good            16              48
        Pet             Health          Cost            Food
        Dog             Ok              14              33
        Cat             Good            15              34
        Parrot          Poor            16              35
        Fish            Ok              17              36
        Pig             Good            18              37
*/
/*
    DMD scans the first couple of rows to determine how many
    columns of data we have (error checking)
*/
needFirstTitle = LImpText_ScanFirstRows (sourceP, &firstLineLen,
        &numOfCols);
    // inside LImpText_ScanFirstRows...
    // Scanning line 1
    xptr = LImpText_CountItems (&tabCount1, &itemCount1,
        &beginTab1, &endTab1, pSource);
    // Scanning line 2
    xptr = LImpText_CountItems (&tabCount2, &itemCount2,
        &beginTab2, &endTab2, xptr);
```

| APPENDIX: 3-D to 2-D Transformation |
| --- |

```
      if (itemCount1 == itemCount2) {
        *pNumCols = itemCount1;
        return FALSE; // this is a regular data array
      }
      // Else we have a missmatch, need row 3 as a tie breaker
      // Scanning line 3
      xptr = LImpText_CountItems (&tabCount3, &itemCount3,
        &beginTab3, &endTab3, xptr);
/*
  DMD stores the first row internally for subsequent
  recognition of the next title row.
*/
      // read in the first row of data from the clipboard
      ec = LImpText_LoadHeaderLine (g, filep, needFirstTitle);
      // inside LImpText_LoadHeaderLine....
      ec = LImpText_CopyLineToBuf (g, filep, &res, gAlterBuf);
      // save the title so we can recognize it when we see it
      // again
      strcpy (gTitleStr, gAlterBuf);
/*
  DMD adds the new column name to the first row and stores
  this as the data header.
*/
      gPageNum = 1;
      LImpText_Get3DPageName (True);
      // start buffer with "new column name" (came from QPW via
      // DDE). Note that we could just assume a column name,
      // e.g. "Page"
      strcpy (gImpBuf, g3DConstName);
      strcat (gImpBuf, strTab);
      // copy rest of line to main buffer
      strcat (gImpBuf, gAlterBuf);
      // now save this buffer into our own data structure
      curLineP = gImpBuf;
      xptr = strtok (curLineP, strTab);
      for (colNum = 0; xptr != NULL; colNum++) {
        // OK to set clear mstr, nulls are valid data
        Mstr_Clear (mstr);
        Mstr_SetTxt (mstr, xptr, NoLen);
        // store the Mstr into our data structure
        Disp_ImportAssignCl_G (g, dispp, dispp->colHead,
          colNum, rowNum, mstr);
        xptr = strtok (NULL, strTab);
      } // end for loop to get first column of data
/*
  DMD scans all the subsequent rows in clipboard data.
*/
      // now read in the rest of the data...
      for (rowNum = ; ; rowNum++) {
        // read in the next line of data
        ec = LimpText_LoadNormLine (g, filep);
        if (gImpBuf[0] == 0) goto FOUND_END_FILE;
        curLineP = gImpBuf;
        xptr = strtok (curLineP, strTab);
        for (colNum = 0; xptr != NULL; colNum++) {
          Mstr_Clear (mstr);
          Mstr_SetTxt (mstr, xptr, NoLen);
          // store the Mstr into our data structure
          Disp_ImportAssignCl_G (g, dispp,
            dispp->data,colNum,rowNum, mstr);
          xptr = strtok (NULL, strTab);
        } // end for loop to get first column of data
        if (ec != 0) goto FOUND_END_FILE;
      } // end outer for loop for rows of data
/*
DMD scans the row to see if it matches the first row.
If it matches then it discards the row and it starts using the
next page name. If it does not match then DMD adds the current
page name as the first element of the data row and it stores the
data internally.
*/
      while (done == False) {
        // keep reading lines till we get a real line of
        // data in gAlterBuf
        ec = LImpText_CopyLineToBuf (g, filep, &res,
          gAlterBuf);
        if (ec == ERR_Eof) done = True;
        if (strncmp (gAlterBuf, gTitleStr, 198) == 0) {
```

-continued

APPENDIX: 3-D to 2-D Transformation

```
        // we found a row matching the first row
        // (title // row), this means we have
        // found the start of the next page. Get
        // the next "page name"
        LImpText_Get3DPageName (False);
        continue; // Read the next line
    } // end if we found another title string
    // start the row with the current "page name"
    strcpy (gImpBuf, tempPageTitles);
    strcat (gImpBuf, strTab);
    strcat (GImpBuf, gAlterBuf); // copy rest of line
    done = True;
} // end while True
// Continues until all of the data has been scanned
/*
  At the conclusion of the transformation, the resulting data
  looks like:
  Country    Pet        Health     Cost       Food
  USA        Dog        Ok         23         44
  USA        Cat        Good       24         45
  USA        Parrot     Poor       25         46
  USA        Fish       Ok         26         47
  USA        Pig        Good       27         48
  England    Dog        Ok         12         44
  England    Cat        Good       13         45
  England    Parrot     Poor       14         46
  England    Fish       Ok         15         47
  England    Pig        Good       16         48
  Egypt      Dog        Ok         14         33
  Egypt      Cat        Good       15         34
  Egypt      Parrot     Poor       16         35
  Egypt      Fish       Ok         17         36
  Egypt      Pig        Good       18         37
*/
```

What is claimed is:

1. In an electronic spreadsheet system having a spreadsheet comprising a plurality of information cells for storing user-supplied data and formulas operative on said data, a method for transforming three-dimensional spreadsheet information into two-dimensional format for generating a cross-tabular report, the method comprising:

(a) receiving user input specifying a three-dimensional block of information cells, said three-dimensional block comprising a plurality of two-dimensional blocks, each of said two-dimensional blocks comprising an array of information cells arranged in row and column format, each of said information cells in said three-dimensional block being uniquely identified by a row, a column, and a spreadsheet page where the cell is located;

(b) transforming said three-dimensional block of spreadsheet information into two-dimensional format by copying rows of spreadsheet information from said three-dimensional block into a two-dimensional block, said transforming step comprising:

(i) determining how many columns are present in said three-dimensional block;

(ii) creating a new two-dimensional block of information cells, said new two-dimensional block having one additional column than that present in said three-dimensional block, so that said new two-dimensional block includes a number of columns that is one more than said determined number of columns in said three-dimensional block, each of said information cells in said new two-dimensional block being uniquely identified by a row and a column;

(iii) storing a first row of information cells from said three-dimensional block as a reference row for recognizing each subsequent page of said three-dimensional block; and (iv) for at least some subsequent rows of information cells present in said three-dimensional block, storing corresponding information in respective columns of said new two-dimensional block of information cells and storing in said additional column an identifier for the page where said each row originated, so that each row of said two-dimensional block comprises a row of information from said three-dimensional block stored together with an identifier for the page where said each row originated, said identifier being determined at least in part on the basis of said recognizing each subsequent page of said three-dimensional block;

(c) receiving additional user input specifying creation of a cross-tabular report based on information from said two-dimensional block of information cells; and (d) in response to said additional user input, displaying a cross-tabular report generated from said two-dimensional block of information cells, so that identifiers for said pages and information cell contents for at least one column appear as cross-tabular labels for the report.

2. The method of claim 1, wherein step (b)(iv) is carried out for each subsequent row, and comprises, for each subsequent row:

comparing the row with said reference row, a given row being considered to match said reference row if each information cell in the given row has a value that equals the value of a corresponding cell in said reference row;

if the row does not match the stored reference row, (a) storing a current page identifier for the row in a first column of a new row of said new two-dimensional block of information cells, and (b) storing remaining information cells of the row in subsequent columns of the new row of said new two-dimensional block; and if the row matches the stored reference row, storing the identifier of the page for the row as the current page identifier without storing information cells of the row.

3. The method of claim 1, wherein an identifier for a page comprises a descriptive text label provided by a user.

4. The method of claim 1, further comprising:

receiving from a user text input characterizing said page identifiers.

5. The method of claim 4, further comprising:

providing the user with a default text label of "Page" for characterizing said page identifiers.

6. The method of claim 1, further comprising:

receiving yet additional user input for repositioning desired ones of said cross-tabular labels; and in response to said additional user input, regenerating said cross-tabular report, so that identifiers for rows, columns, and pages appear as repositioned cross-tabular labels for the report.

7. The method of claim 1, wherein said identifiers for said pages appear as side cross-tabular labels.

8. An electronic spreadsheet system for storing and manipulating information as a three-dimensional spreadsheet and for representing said information to a user as a two-dimensional report, the system comprising:

a computer having an input device, a display device, and a storage device;

means for displaying on said display device a plurality of spreadsheet pages, each of said spreadsheet pages comprising an array of information cells arranged in row and column format, at least some of said information cells representing information stored in said storage device, including user-supplied information and formulas operative on said user-supplied information, each of said information cells in said three-dimensional block being uniquely identified by row, column, and page identifiers indicating where the cell is located;

means, responsive to signals from said input device, for selecting a three-dimensional block of information cells, said three-dimensional block being characterized by a number of columns; and means for transforming said three-dimensional block of spreadsheet information into a two-dimensional block for cross-tabular analysis, said means for transforming including:

means for creating a new two-dimensional block of information cells, said new two-dimensional block having one additional column than that present in said three-dimensional block, so that said new two-dimensional block includes a number of columns that is one more than said number of columns in said three-dimensional block, each of said information cells in said new two-dimensional block being uniquely identified by a row and a column;

means for identifying which rows of said three-dimensional block match a first one of said rows in said three-dimensional block, a given row being considered to match said first one of said rows if each cell in the given row has a value that equals the value of a corresponding cell in said first one of said rows; and means for storing, only for each row of said three-dimensional block that does not match said first one of said rows, corresponding information in said new two-dimensional block of information cells, so that (a) each row of said new two-dimensional block comprises a row of information from said three-dimensional block stored together with an identifier for the page where said each row originated, said identifier for the page being stored in said additional column, and (b) said new two-dimensional block of information does not comprise subsequent rows of said three-dimensional block that do match said first one of said rows.

9. The system of claim 8, wherein said three-dimensional block of information cells comprises a plurality of rows, and wherein at least two of said rows match.

10. The system of claim 8, wherein an identifier for a page comprises a descriptive text label provided by a user.

11. The system of claim 8, and further comprising:

means for displaying on said display device said new two-dimensional block wherein each row in said two-dimensional block that corresponds to a row in said three-dimensional block has a first column containing the page identifier for the page where the row originated and remaining columns containing the row of information from said three-dimensional block.

12. The system of claim 11, wherein said new two-dimensional block of information cells is displayed with rows originating from a given page in said three-dimensional block grouped together.

13. In an electronic spreadsheet system having a spreadsheet comprising a plurality of information cells for storing user-supplied data and formulas operative on said data, a method for transforming a three-dimensional block of spreadsheet information into a corresponding two-dimensional block of spreadsheet information for generating summary reports, the method comprising:

(a) receiving user input specifying a three-dimensional block of information cells to be transformed, said three-dimensional block comprising information cells arranged in row, column, and page format, each row, column, and page having a particular name;

(b) determining column labels from information stored in said three-dimensional block, said column labels describing contents stored in each column of said three-dimensional block;

(c) determining page labels from information stored in said three-dimensional block, said page labels describing contents stored in each page of said three-dimensional block;

(d) transforming said three-dimensional block into a new two-dimensional block, said new two-dimensional block having a plurality of information cells arranged in row and column format, wherein columns of said new two-dimensional block include labels based on said determined column labels, and wherein each row of said new two-dimensional block stores a row of cell information taken from said three-dimensional block together with a label based on said determined page labels, each of said information cells in said new two-dimensional block being uniquely identified by a row and a column;

(e) displaying said new two-dimensional block with a column including said determined page labels;

(f) receiving additional user input specifying creation of a cross-tabulation report; and (g) displaying a cross-tabular report generated from said new two-dimensional block of information cells, so that identifiers for said pages and information cell contents for at least one column appear as cross-tabular labels for the report.

14. The method of claim 13, wherein step (d) includes:

determining a current page identifier for each row of said three-dimensional block; and storing the current page identifier for said each row in a first column of a new row of said new two-dimensional block of information cells, together with information cells taken from a row of said three-dimensional block.

15. The method of claim 14, wherein said determining step includes:

comparing cell contents for each row against a reference row of information cells, said reference row comprising a row of text labels present on each page of said three-dimensional block, a match between a given row and said reference row being considered to occur if each cell in the given row has a value that equals the value of a corresponding cell in said reference row;

if a match does not occur, storing the current page identifier for said each row in a first column of a new row of said new two-dimensional block of information cells, together with information cells taken from a row of said three-dimensional block; and if a match occurs, storing the page identifier for cells of said each row as the current page identifier without storing information cells of the row.

16. The method of claim 13, wherein said three-dimensional block of information cells comprises a plurality of cell rows, and wherein at least two of said rows store identical information.

17. In an electronic spreadsheet system having a spreadsheet comprising a plurality of information cells for storing user-supplied data and formulas operative on said data, a method for transforming a three-dimensional block of spreadsheet information into a corresponding two-dimensional block of spreadsheet information and generating summary reports, the method comprising:

displaying on a display device a plurality of spreadsheet pages, each of said spreadsheet pages comprising an array of information cells arranged in row and column format, at least some of said information cells representing information stored in a storage device, including user-supplied information and formulas operative on said user-supplied information, each of said information cells in said three-dimensional block being uniquely identified by row, column, and page identifiers indicating where the cell is located;

in response to user input, selecting a three-dimensional block of information cells, said three-dimensional block being characterized by a number of columns;

creating a new two-dimensional block of information cells, said new two-dimensional block having one additional column than that present in said three-dimensional block, so that said new two-dimensional block includes a number of columns that is one more than said number of columns in said three-dimensional block, each of said information cells in said new two-dimensional block being uniquely identified by a row and a column;

identifying which rows of said three-dimensional block match a first one of said rows in said three-dimensional block, a given row being considered to match said first one of said rows if each cell in the given row has a value that equals the value of a corresponding cell in said first one of said rows;

storing, only for each row of said three-dimensional block that does not match said first one of said rows, corresponding information in said two-dimensional block of information cells, so that (a) each row of said new two-dimensional block comprises a row of information from said three-dimensional block stored together with an identifier for the page where said each row originated, said identifier for the page being stored in said additional column, and (b) said new two-dimensional block of information does not comprise subsequent rows of said three-dimensional block that do match said first one of said rows;

displaying said two-dimensional block with a column including said determined page labels;

in response to additional user input, generating a cross-tabulation report from said two-dimensional block of information cells; and displaying the cross-tabular report, so generated, so that identifiers for said pages and information cell contents for at least one column appear as cross-tabular labels for the report.

18. The method of claim 17, wherein an identifier for a page comprises a descriptive text label provided by a user.

19. The method of claim 17, further comprising:

receiving from a user text input characterizing said page identifiers.

20. The method of claim 17, further comprising:

providing the user with a default text label of "Page" for characterizing said page identifiers.

21. The method of claim 17, further comprising:

receiving yet additional user input for repositioning desired ones of said cross-tabular labels; and in response to said yet additional user input, regenerating said cross-tabular report, so that identifiers for rows, columns, and pages appear as repositioned cross-tabular labels for the report.

22. The method of claim 17, wherein said identifiers for said pages appear as side cross-tabular labels.

23. The method of claim 17, wherein said two-dimensional block of information cells is displayed with rows originating from a given page in said three-dimensional block grouped together.

* * * * *